US011632456B1

(12) United States Patent
Mevorah et al.

(10) Patent No.: US 11,632,456 B1
(45) Date of Patent: Apr. 18, 2023

(54) CALL BASED EMOTION DETECTION

(71) Applicant: Amazon Technologies, Inc., Seattle, WA (US)

(72) Inventors: Mark Jared Mevorah, Seattle, WA (US); Njenga Kariuki, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 74 days.

(21) Appl. No.: 17/101,769

(22) Filed: Nov. 23, 2020

(51) Int. Cl.
| H04M 1/72454 | (2021.01) |
| G10L 15/22 | (2006.01) |
| H04M 1/656 | (2006.01) |
| G10L 15/18 | (2013.01) |
| G10L 15/04 | (2013.01) |
| H04M 1/72484 | (2021.01) |

(52) U.S. Cl.
CPC ......... H04M 1/72454 (2021.01); G10L 15/04 (2013.01); G10L 15/1815 (2013.01); G10L 15/22 (2013.01); H04M 1/656 (2013.01); *H04M 1/72484* (2021.01); *H04M 2201/40* (2013.01); *H04M 2250/12* (2013.01)

(58) Field of Classification Search
CPC ............. H04M 1/72454; H04M 1/656; H04M 1/72484; H04M 2201/40; H04M 2250/12; G10L 15/04; G10L 15/1815; G10L 15/22
See application file for complete search history.

(56) References Cited

U.S. PATENT DOCUMENTS

| 2015/0169832 A1* | 6/2015 | Davis ................... | G06F 3/0346 702/19 |
| 2016/0044151 A1* | 2/2016 | Shoemaker ........... | H04M 19/02 455/556.1 |
| 2016/0065724 A1* | 3/2016 | Lee ....................... | G16H 40/63 455/556.1 |
| 2016/0379205 A1* | 12/2016 | Margadoudakis ... | G06Q 20/327 705/71 |

FOREIGN PATENT DOCUMENTS

KR        20200075123 A  *  6/2020   ............. G10L 25/63

OTHER PUBLICATIONS

Aguilar, G., et al., "Multimodal and Multi-view Models for Emotion Recognition," in ACL, 2019, https://www.aclweb.org/anthology/P19-1095.pdf, 12 pages.

(Continued)

*Primary Examiner* — Farid Seyedvosoghi
(74) *Attorney, Agent, or Firm* — Athorus, PLLC

(57) ABSTRACT

Described are systems and methods that detect a call connection of a call (e.g., telephone call, social media call, etc.) between a first device of a user, such as a cellular phone, and a device of another person with which the user is to interact via the call. Upon detection of the call connection, another device of the user (e.g., wearable) records audio of the environment to detect speech output by the user during the call. The speech is then processed to determine sentiment(s) of the user during the call. The determined sentiment(s) of the user may then be presented to the user to aid the user in understanding how the speech of the user is perceived by others.

20 Claims, 20 Drawing Sheets

(56) References Cited

OTHER PUBLICATIONS

Ba, J. L., et al., "Layer Normalization," in NIPS Deep Learning Symposium, 2016, https://arxiv.org/pdf/1607.06450.pdf, 14 pages.
Bergstra, J. and Bengio, Y., "Random Search for Hyper-Parameter Optimization," JMLR, 2012, http://jmlr.csail.mit.edu/papers/volume13/bergstra12a/bergstra12a.pdf, 25 pages.
Busso, C., et al., "IEMOCAP: Interactive Emotional Dyadic Motion Capture Database," Language Resources and Evaluation, Kluwer Academic Publishers, 2008, https://sail.usc.edu/publications/files/BussoLRE2008.pdf, 30 pages.
Devlin, J., et al., "BERT: Pre-training of Deep Bidirectional Transformers for Language Understanding," in HLT, 2019, https://www.aclweb.org/anthology/N19-1423.pdf, 16 pages.
Dhingra, B., et al., "Tweet2Vec: Character-Based Distributed Representations for Social Media," in ACL, 2016, https://www.cs.cmu.edu/~wcohen/postscript/acl-2016-bd.pdf, 6 pages.
Graves, A., et al., "Connectionist Temporal Classification: Labelling Unsegmented Sequence Data with Recurrent Neural Networks," in ICML, 2006, https://www.cs.toronto.edu/~graves/icml_2006.pdf, 8 pages.
Greedy Decoder, https://www.tensorflow.org/api_docs/python/tf/nn/ctc_greedy_decoder, (downloaded Jun. 14, 2017, by web.archive.org).
He, K., et al., "Deep Residual Learning for Image Recognition," in CVPR, 2016, http://openaccess.thecvf.com/content_cvpr_2016/papers/He_Deep_Residual_Learning_CVPR_2016_paper.pdf, 9 pages.
Hochreiter, S. and Schmidhuber, J., "Long Short-Term Memory," Neural Computation, vol. 9, No. 8, pp. 1735-1780, 1997, https://www.researchgate.net/profile/Sepp_Hochreiter/publication/13853244_Long_Short-term_Memory/links/5700e75608aea6b7746a0624/Long-Short-term-Memory.pdf?origin=publication_detail,33 pages.
Lakomkin, E., et al., "Incorporating End-To-End Speech Recognition Models For Sentiment Analysis," in ICRA, 2019, https://arxiv.org/pdf/1902.11245.pdf, 7 pages.
Lin, L. I-K., "A Concordance Correlation Coefficient to Evaluate Reproducibility," Biometrics, 1989, https://pdfs.semanticscholar.org/1527/ba83e2656b0427052b5209c0470affa318ef.pdf?_ga=2.221014936.1226002713.1582334499-1985355348.1527123823, 14 pages.
Liu, Z., et al., "Entity Recognition from Clinical Texts via Recurrent Neural Network," BMC Medical Informatics and Decision Making, 2017, https://bmcmedinformdecismak.biomedcentral.com/track/pdf/10.1186/s12911-017-0468-7, 9 pages.
Lotfian, R. and Busso, C., "Building Naturalistic Emotionally Balanced Speech Corpus by Retrieving Emotional Speech from Existing Podcast Recordings," IEEE Transactions on Affective Computing, 2017, 13 pages.
Lu, Z. et al., Speech Sentiment Analysis via Pre-Trained Features from End-to-End ASR Models, Computation and Language (cs.CL); Machine Learning (cs.LG); Audio and Speech Processing (eess.AS), 5 pages, https://arxiv.org/pdf/1911.09762.pdf.
Metze, F., et al., "Emotion Recognition using Imperfect Speech Recognition," in Interspeech, 2010, http://www.cs.cmu.edu/~fmetze/interACT/Publications_files/publications/emo-asr_is.pdf, 4 pages.
Miao, Y., et al., "EESEN: End-To-End Speech Recognition Using Deep Rnn Models and WFST-Based Decoding," in ASRU, 2015, http://www.cs.cmu.edu/~fmetze/interACT/Publications_files/publications/eesenasru.pdf, 8 pages.
Neto, J., et al., "Speaker-Adaptation for Hybrid Hmm-Ann Continuous Speech Recognition System," in Eurospeech, 1995, https://www.researchgate.net/profile/Ciro_Martins/publication/2421983_Speaker-Adaptation_For_Hybrid_Hmm_Ann_Continuous_Speech_Recognition_System/links/0c9605186c6a9dcde0000000/Speaker-Adaptation-For-Hybrid-Hmm-Ann-Continuous-Speech-Recognition-System.pdf?origin=publication_detail, 5 pages.
Pandit, V. and Schuller, B., "On Many-To-Many Mapping Between Concordance Correlation Coefficient snd Mean Square Error," arXiv:1902.05180, 2019, https://arxiv.org/pdf/1902.05180.pdf.
Preoţiuc-Pietro, D., et al., "Modelling Valence and Arousal in Facebook Posts," in WASSA, 2016, http://wwbp.org/papers/va16wassa.pdf, 7 pages.
Radford, A., "Learning to Generate Reviews and Discovering Sentiment," arXiv:1704.01444, 2017, https://arxiv.org/pdf/1704.01444.pdf, 9 pages.
Rozgić, V., et al., "Emotion Recognition Using Acoustic and Lexical Features," in Interspeech, 2012, https://pdfs.semanticscholar.org/5259/39fff6c81b18a8fab3e502d61c6b909a8a95.pdf?_ga=2.28666044.1226002713.1582334499-1985355348.1527123823, 4 pages.
Rozgic, V., et al., "Multi-Modal Prediction of PTSD and Stress Indicators," in ICASSP, 2014, 5 pages.
Schuller, B., et al., "Emotion Recognition from Speech: Putting ASR in the Loop," in ICASSP, 2009, https://www.researchgate.net/profile/Anton_Batliner/publication/224929707_Emotion_Recognition_from_Speech_Putting_ASR_in_the_Loop/links/0fcfd50f6bb1a766a1000000/Emotion-Recognition-from-Speech-Putting-ASR-in-the-Loop.pdf?origin=publication_detail, 5 pages.
Schuller, B.W., "Speech Emotion Recognition," Communications of the ACM, vol. 61, No. 5, pp. 90-99, 2018, 10 pages.
Seyeditabari, A., et al., "Emotion Detection in Text: A Review," arXiv:1806.00674, 2018, https://arxiv.org/pdf/1806.00674.pdf, 14 pages.
Stuhlsatz, A., et al., "Deep Neural Networks for Acoustic Emotion Recognition: Raising the Benchmarks," in ICASSP, 2011, https://mediatum.ub.tum.de/doc/1107313/file.pdf, 4 pages.
Xiao, Y. and Cho, K., "Efficient Character-Level Document Classification By Combining Convolution and Recurrent Layers," arXiv:1602.00367, 2016, https://arxiv.org/pdf/1602.00367.pdf, 10 pages.
Yao, K., et al., "Adaptation of Context-Dependent Deep Neural Networks for Automatic Speech Recognition," in SLT, 2012, https://www.microsoft.com/en-us/research/wp-content/uploads/2016/02/0000366.pdf, 4 pages.
Yoon, S., et al., "Multimodal Speech Emotion Recognition Using Audio and Text," in SLT, 2018, https://arxiv.org/pdf/1810.04635.pdf, 7 pages.
Zhang, B., et al., "Exploiting Acoustic and Lexical Properties of Phonemes to Recognize Valence from Speech," in ICASSP, 2019, http://web.eecs.umich.edu/~emilykmp/EmilyPapers/2019_Zhang_ICASSP.pdf, 5 pages.
Zhang, X., et al., "Character-level Convolutional Networks for Text Classification," in NIPS, 2015, http://papers.nips.cc/paper/5782-character-level-convolutional-networks-for-text-classification.pdf, 9 pages.

* cited by examiner

US 11,632,456 B1

CALL BASED EMOTION DETECTION

BACKGROUND

Participants in a conversation may be affected by the emotional state of one another as perceived by their voice. For example, if a speaker is excited, a listener may perceive that excitement in their speech. However, a speaker may not be aware of the emotional state that may be perceived by others as conveyed by their speech. A speaker may also not be aware of how their other activities affect the emotional state as conveyed by their speech. For example, a speaker may not realize a trend that their speech sounds irritable to others on days following a restless night.

DETAILED DESCRIPTION

Figure 1A:
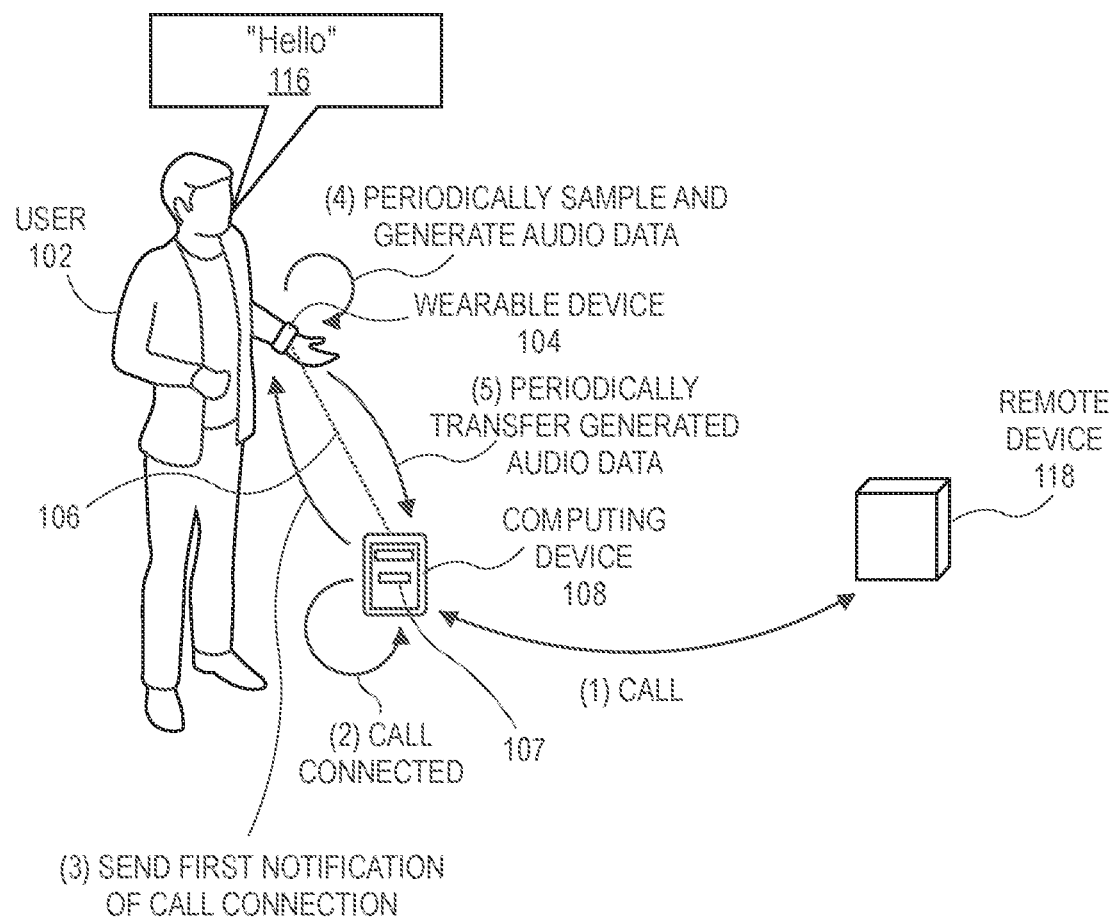
FIGS. 1A-1B illustrate an example transition for determining sentiment of a user during a call, in accordance with described implementations.

A person's emotional state may also impact others with which the person communicates. For example, a person who speaks with someone in an angry tone may produce in that listener an anxious emotional response.

Information about the emotional state that an individual is expressing may be useful to helping that individual. For example, if the angry person is speaking to their friend, the friend may let them know. With that awareness, the angry person may then be able to modify their behavior. As useful as this feedback is, it is infeasible to have a friend constantly present who is able to tell a person the emotional state expressed in their voice.

Described are systems and methods that detect a call connection of a call (e.g., telephone call, social media call, etc.) between a first device of a user, such as a cellular phone, and a device of another person with which the user is to interact via the call. For example, a user of the first device may initiate a call to a device of a second person. Alternatively, the first device may receive a call for the user from another device of the second person. In still other examples, an application executing on the first device of the user may initiate or receive a social media call with another device of another person. A call, as used herein, is any audio and/or audio/video communication session between a first device of a user and another device.

Regardless of how the call is connected, upon detection of the call connection, an application executing on the first device may send a first notification to a second device of the user, such as a wearable device, indicating the call connection. In response to the receipt of the first notification, the first device may begin sampling audio within the environment in which the user is located to determine if the audio includes speech of the user. If it is determined that the sampled audio includes the speech of the user, audio data of the audio and speech of the user is generated by the second device. Sampling of audio and generation of audio data when user speech is detected in the audio may continue at the second device of the user during the duration of the call.

As discussed further below, because people typically take turns talking during a call, the disclosed implementations may generate multiple audio data segments, each corresponding to a time when the user is talking and including the speech of the user output by the user during the call. Because the second device is independent of the first device and the call, it may not detect speech of another person with which the user is interacting.

At some point, a call disconnection of the call is detected at the first device. In response to detection of the call disconnection, a second notification is sent from the first device to the second device indicating the call disconnection. In response to receiving the second notification, the second device stops sampling and generating audio data and transmits the generated audio data from the second device to the first device. In some implementations, audio data segments generated during the call may be transmitted from the second device to the first device during the call. In other implementations, all the audio data generated for the call may be maintained on the second device until receipt of the second notification and then transmitted to the first device.

In addition to transmitting the audio data from the second device to the first device, each audio data segment generated by the second device during the call is associated as a single call interaction. Associating the audio data segments as a single call interaction may be performed on the first device and/or the second device. Regardless, the collection of audio data segments associated with the call interaction may then be processed using one or more of the audio data processing techniques discussed herein to determine a sentiment(s) of the user during the call. In some implementations, the sentiment of the user may be determined in real-time or near real-time during the call. Alternatively, processing of the audio data and determination of sentiment(s) for the user during the call may be performed after the call is disconnected.

Finally, the sentiment of the user during the call may be presented to the user to aid the user in understanding how their tone is perceived by others. In some implementations, the audio data may be processed during the call and the sentiment of a user provided in real-time or near real-time during the call. In other implementations, the sentiment(s) during the call may be presented to the user as a call summary following the call. In addition, in some implementations, actions, suggestions, and/or activities that the user may follow to improve or alter their sentiment may also be presented.

The wearable device (second device) may comprise a band, bracelet, necklace, earring, brooch, earphones, and so forth. The wearable device may comprise one or more microphones and a computing device. The wearable device may be in communication with another device of the user, such as a smartphone (first device), receive notifications from the first device, such as the first notification and the second notification discussed above, and/or send generated audio data to the first device (e.g., smartphone). For example, the wearable device may provide audio data to the smartphone for processing. In other implementations, the wearable device may perform some or all of the processing discussed herein. In still other examples, the smartphone or other device may generate the audio data and process the audio data, as discussed herein. In other implementations, the functionality of the system as described may be provided by a single device or distributed across other devices.

The sentiment data is determined by analyzing characteristics of the user's speech as expressed in the audio data. Changes over time in pitch, pace, and so forth may be indicative of various emotional states. For example, the emotional state of speech that is described as "excited" may correspond to speech which has a greater pace while slower paced speech is described as "bored." In another example, an increase in average pitch may be indicative of an emotional state of "angry" while an average pitch that is close to a baseline value may be indicative of an emotional state of "calm." Various techniques may be used individually or in combination to determine the sentiment data including, but not limited to, signal analysis techniques, classifiers, neural networks, and so forth. The sentiment data may be provided as numeric values, vectors, associated words, etc.

Figure 1B:
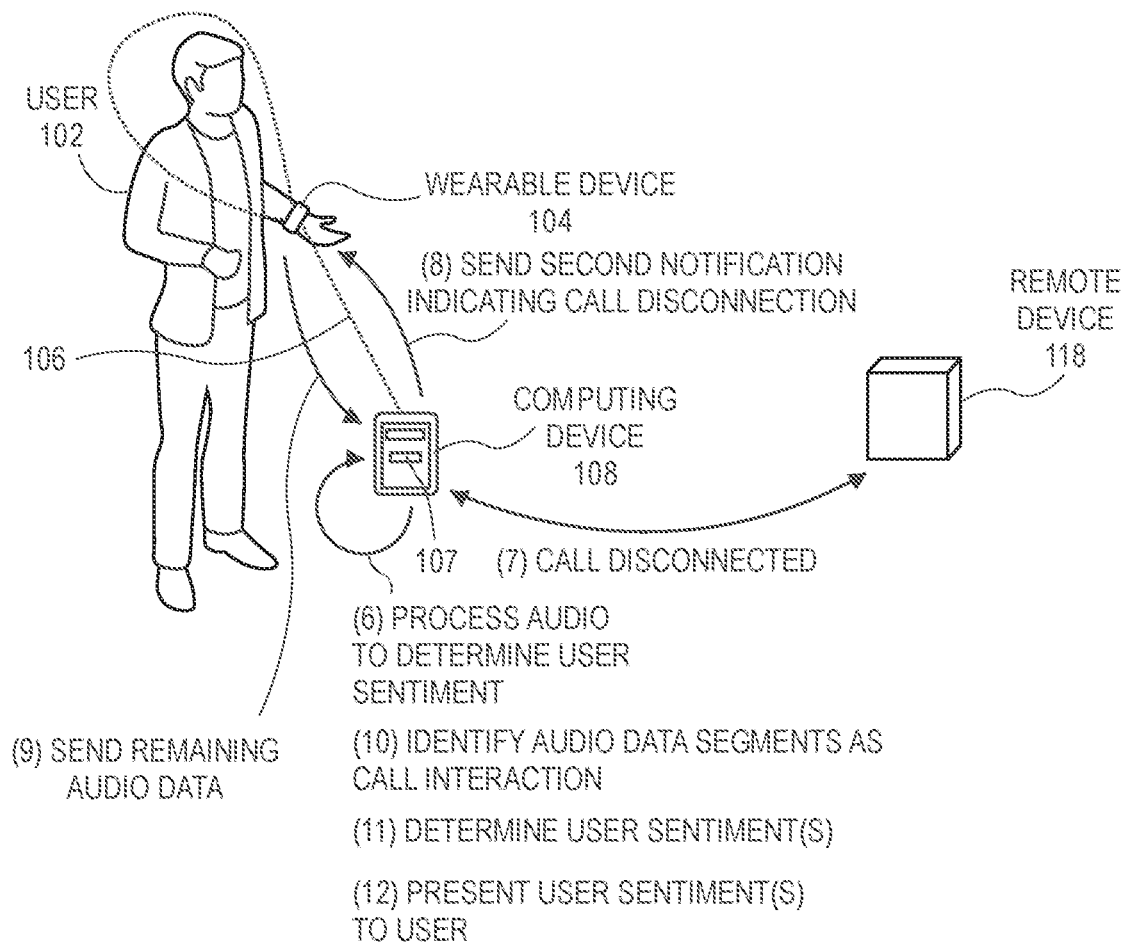

FIGS. 1A-1B illustrate an example transition for determining sentiment of a user during a call, in accordance with described implementations.

The user 102 may have one or more wearable devices 104 on or about their person. The wearable device 104 may be implemented in various physical form factors including, but not limited to, the following: hats, headbands, necklaces, pendants, brooches, armlets, brassards, bracelets, wristbands, and so forth. In this illustration, the wearable device 104 is depicted as a wristband.

The wearable device 104 may use a communication link 106 to maintain communication with a computing device 108 and to receive and/or send information or audio data. For example, the computing device 108 may include a smartphone, tablet computer, personal computer, internet enabled device, voice activated device, smart-home device, and other device that may be used to establish a call with another device 118. As discussed above, the call may be any type of audio and/or audio/video communication.

The illustrated transition begins with a call between the computing device 108 of the user and any remote device 118. The call may be an incoming call from the remote device 118 or an outgoing call from the computing device 108. When the call between the computing device 108 and the remote device 118 is connected, a connection event is generated by the computing device 108 and detected by an application 107 executing on the computing device 108. Upon detection of the call connection, the application 107 sends, via a wireless communication link 106 between the computing device 108 and the wearable device 104 a first notification indicating the call connection.

The wearable device, in response to receiving the first notification, begins sampling audio within the environment in which the wearable device and the user are located to determine if the audio includes a speech 116 of the user 102. For example, characteristics of the signal present in the sampled audio such as frequency, energy, zero-crossing rate, and so forth may be analyzed with respect to threshold values to determine characteristics that are deemed likely to be human speech.

Once at least a portion of the audio has been determined to contain speech, an audio preprocessing module of the wearable device may further process this portion to determine whether the first audio data includes a speech of the user 102. If it is determined that the audio includes speech of the user 102, audio data representative of the audio that includes the speech of the user is generated.

Processing of the audio as audio data is generated may continue to determine when the user stops speaking. When the user is determined to have stopped speaking, generation of the audio data is terminated and periodic sampling of the audio resumes to determine when/if the user starts speaking again during the call. This process of sampling and generating audio data may continue during the duration of the call and multiple audio data segments may be generated, one for each instance during which speech of the user is detected in the audio.

In some implementations, generated audio data may be periodically sent, during the call, from the wearable device to the computing device 108 for additional processing by the computing device 108. Referring to FIG. 1B, processing of the generated audio data may be done to determine a sentiment of the speech of the user, as discussed further below. As the sentiment is determined, the sentiment may be presented to the user in real-time or near real-time during the call.

At some point the call is disconnected. Similar to call connection, call disconnection generates an event at the computing device that is detected by the application 107 executing on the computing device. Upon detection of the call disconnection, the application executing on the computing device sends a second notification to the wearable device 104 indicating that the call was disconnected.

The wearable device, in response to receiving the second notification, stops generating audio data and sends any remaining generated audio data to the computing device 108.

In addition, either the wearable device and/or the computing device, upon call disconnection, associates each of the audio data segments that include speech of the user that were generated during the call as part of a single call interaction.

The computing device 108 completes processing of the audio data segments that include the speech of the user that were generated during the call to determine the sentiment(s) of the user during the call. Finally, the computing device presents the determined sentiment(s) of the user during the call to the user.

While the above example describes that the audio data is transferred from the wearable device to the computing device and processed at the computing device to determine the sentiment of the user based on the speech of the user during the call, in other implementations, the audio data may be processed at the wearable device to determine the sentiment(s) of the user during the call and the sentiment(s) may be presented to the user by the wearable device and/or sent from the wearable device to the computing device 108, optionally without sending the audio data.

Figure 2:
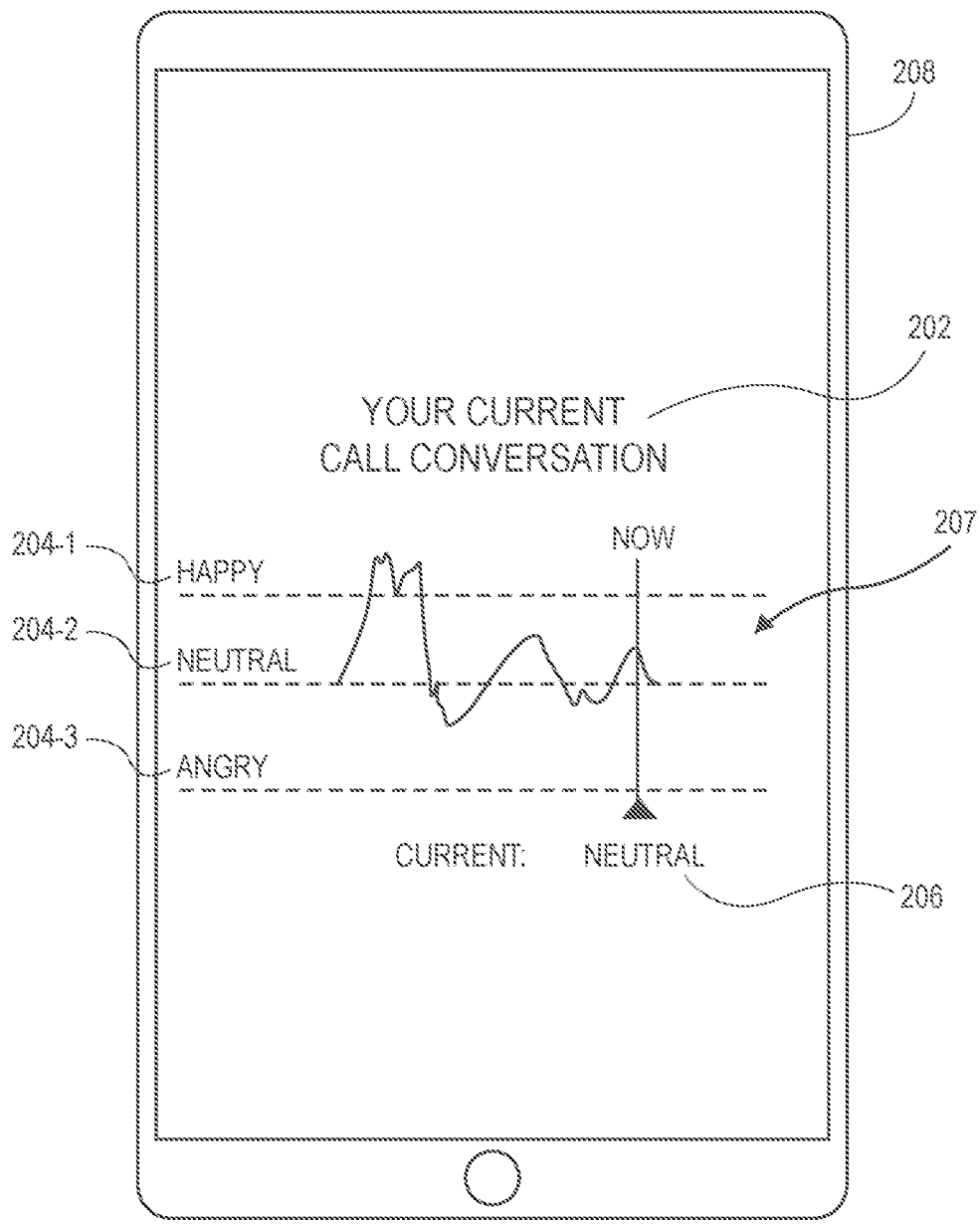
FIG. 2 is an example presentation of a sentiment of a user determined in real-time or near real-time during a call, in accordance with described implementations.

FIG. 2 is an example presentation of a sentiment of a user determined in real-time or near real-time during a call, in accordance with described implementations.

As discussed, audio data segments that include a speech of the user that are generated during a call may be processed in real-time or near real-time to determine the current sentiment of the user during the call. In such an implementation, as the sentiment of the user is determined, the sentiment may be presented in a display of the computing device 208 for presentation to the user during the call. For example, the user interface of the current call conversation 202 may present a moving graph 207 that indicates the current and historical sentiments determined from the speech of the user during the call. In this example, the graph 207 indicates whether the sentiment of the user is determined to be happy 204-1, neutral 204-2, or angry 204-3. In other implementations, the user interface may be presented on other devices.

As the call progresses, audio data that includes speech of the user is processed to determine the sentiment of the user during that portion of the call and the current call conversation 202 interface is updated to illustrate the determined sentiment. In the illustrated example, the current sentiment of the user of Neutral 206 is determined and presented to the user in real-time or near real-time during the call.

Alternatively, or in addition to providing sentiment of the call as the call is occurring, the disclosed implementations may present a summary of the sentiment(s) determined during the call after the call has completed, referred to herein as a call summary.

Figure 3:
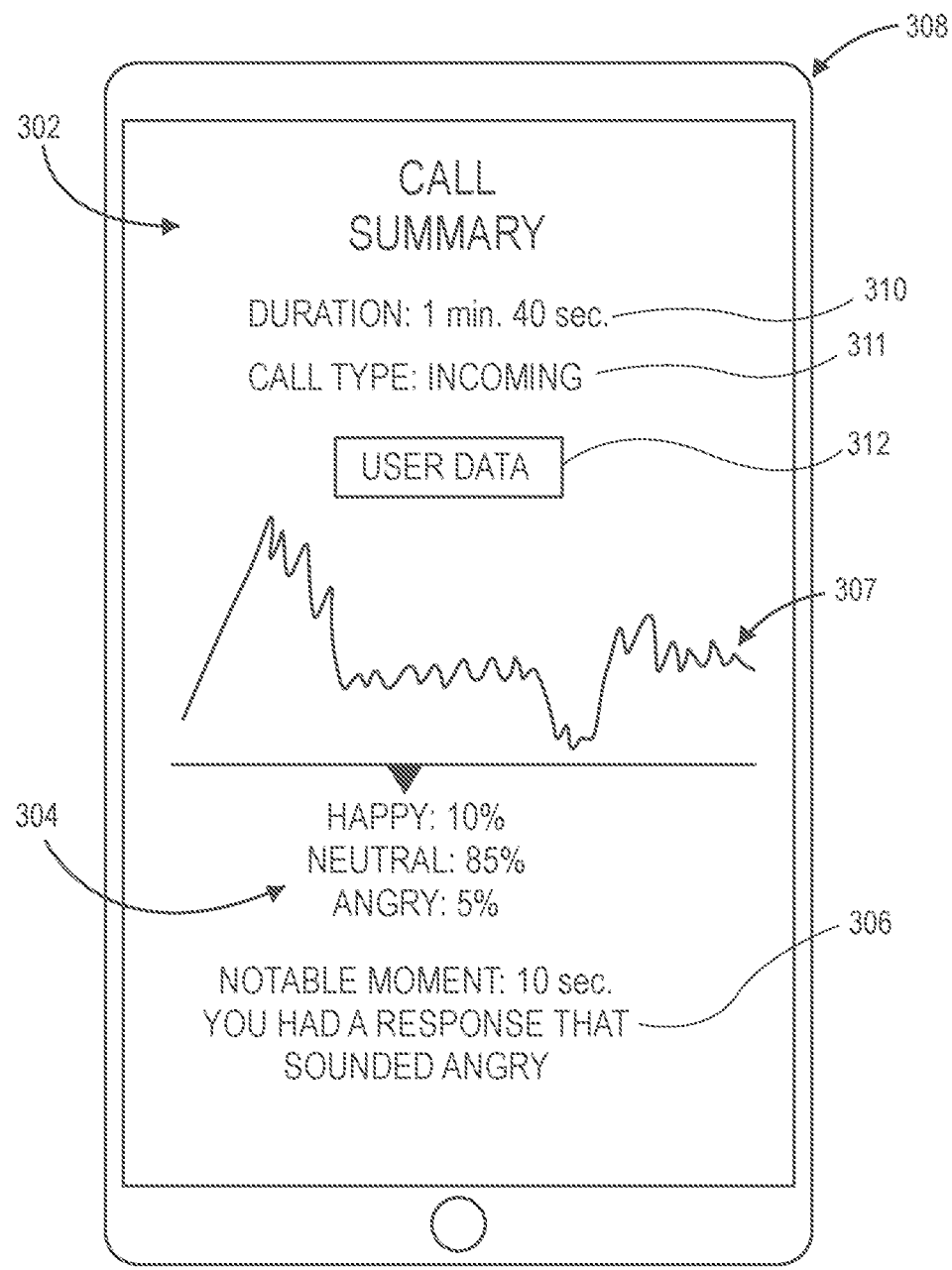
FIG. 3 is an example presentation of a call sentiment summary, in accordance with described implementations.

For example, FIG. 3 is a presentation of a call summary 302, in accordance with described implementations.

In the illustrated example, the call summary 302 is presented on a display of a computing device 308. In other implementations, the call conversation summary may be presented on displays of other devices, such as a display of a wearable device, a laptop, tablet, etc.

Similar to the information presented during a call, as discussed with respect to FIG. 3, graphical illustration 307 indicating the sentiment(s) of the user during the duration of the call may be presented. A percentage 304 of each determined sentiment, or the top sentiments, Neutral may also be presented. For example, in the illustrated example, it is determined that the user speech was processed to determine that the user expressed the sentiment of happy 10% of the time, neutral 85% of the time, and angry 5% of the time during the call. In other implementations, the determined sentiment of the user may be presented differently.

In addition to presenting an overview of the sentiment(s) determined for the user during the call, information regarding notable moments 306 detected during the call may also be presented. A notable moment may be determined based on a sudden change in the tone of the user, a change in heart rate of the user, a change in blood pressure of the user, etc. In the illustrated example, it is determined that a notable moment 306 occurred for 10 seconds when the user had a response that was determined to be angry.

The call summary 302 may also indicate additional information about the call including, but not limited to, the duration 310 of the call, the type of call 311 and/or user data 312 about the user during the call. User data may be collected or determined from data of one or more sensors of the wearable device during the call. User data may include, but is not limited to, heart rate, blood pressure, blood oxygen level, body temperature, core temperature, etc. In the illustrated example, the user may select the User Data control 312 to view additional user data about the user that was determined during the call.

Figure 4:
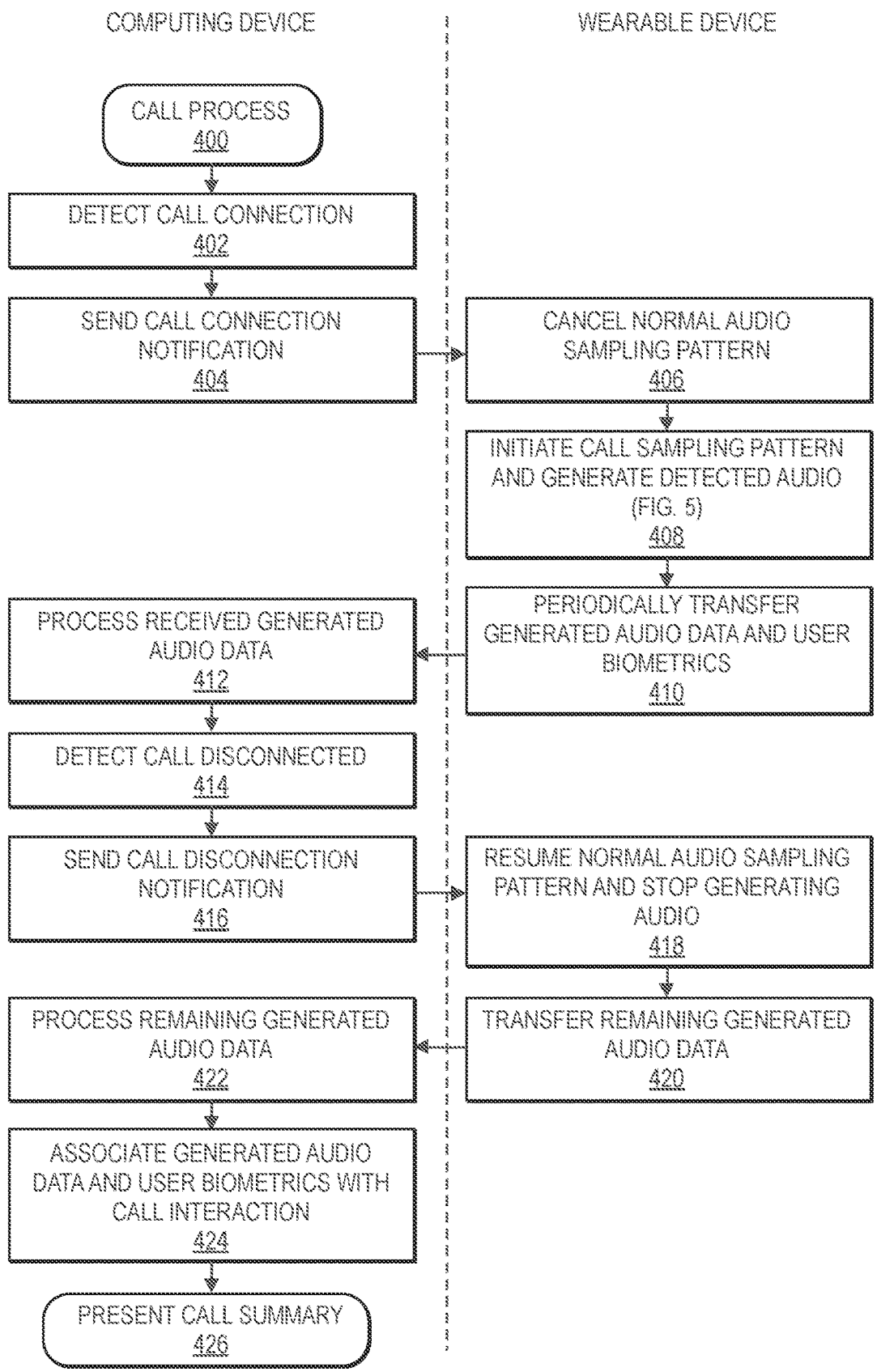
FIG. 4 is an example call process, in accordance with described implementations.

FIG. 4 is an example call process 400, in accordance with described implementations.

The example process 400 begins upon detection by the computing device of a call connection (incoming or outgoing), as in 402. As discussed above, when a call with a computing device is connected, the computing device may generate a connection notification that is detectable by an application executing on the computing device.

Upon detection of the call connection, the first notification is sent from the computing device of the user to the wearable device of the user that is in communication with the computing device indicating to the wearable device that the call connection has been detected, as in 404.

The wearable device, during normal operation may be configured to periodically sample for audio that includes human speech according to a normal audio sampling pattern. The normal audio sampling pattern may be a set sampling frequency (e.g., sample every fifteen minutes) or may be more complex where the time between sampling changes depending on when the last human speech was detected. Upon receiving the first notification that the call connection was detected, the normal sampling pattern may be canceled, as in 406, and a call sampling pattern may be initiated and audio data generated for audio that is determined to include speech of the user associated with the device and/or the wearable device, as in 408. The call sampling pattern may indicate, for example, that audio is to be sampled upon initiation of the call sampling pattern and then again every two minutes. In other implementations, the duration between sampling may be more or less frequent. Periodic sampling may be done to conserve battery life of the battery or other power supply of the wearable device. Periodic sampling and generation of audio data is discussed further with respect to FIG. 5.

In this example, as audio data that includes speech of the user is generated by the wearable device and optionally as user biometrics are collected by sensors of the wearable device, the generated audio data and collected user biometrics may be periodically sent from the wearable device to the computing device, as in 410. For example, each time an audio data segment that includes a user speech if generated, the audio data segment and user biometrics recorded during generation of the audio data segment may be transmitted from the wearable device to the computing device. While this example illustrates periodically sending generated audio data from the wearable device to the computing device during the call, in other implementations, the generated audio data may be maintained on the wearable device.

As the generated audio data is received at the computing device, the generated audio data is processed to determine the sentiment(s) of the user expressed in the speech of the user represented in the generated audio data, as in 412. This process of generating audio data at the wearable device, periodically transmitting the audio data from the wearable device to the computing device, and processing the audio data at the computing device to determine the sentiment of the user may continue until a call disconnection is detected at the computing device, as in 414. As discussed above, when a call is disconnected, the computing device may generate an event or other notification of the call disconnection that is detected by an application executing on the computing device.

In response to receiving the call disconnection, a second notification is sent from the computing device to the wearable device indicating the call disconnection, as in 416.

Upon receipt of the second notification at the wearable device, the wearable device stops generating audio data for the call and resumes the normal audio sampling pattern, as in 418. In addition, any generated audio data for the call that remains at the wearable device may be transmitted from the wearable device to the computing device, as in 420. The computing device, upon receipt of the remaining generated audio data, processes the received audio data to determine sentiment(s) of the user expressed in the audio data, as in 422. In addition, all audio data segments received from the wearable device that were generated during the call (i.e., between the first notification and the second notification), and optionally the user biometrics collected during the call, are associated as a single call interaction, as in 424.

Finally, the call summary that includes at least the sentiment(s) determined for the user during the call are presented, as in 426, and as illustrated in FIG. 3 above.

Figure 5:
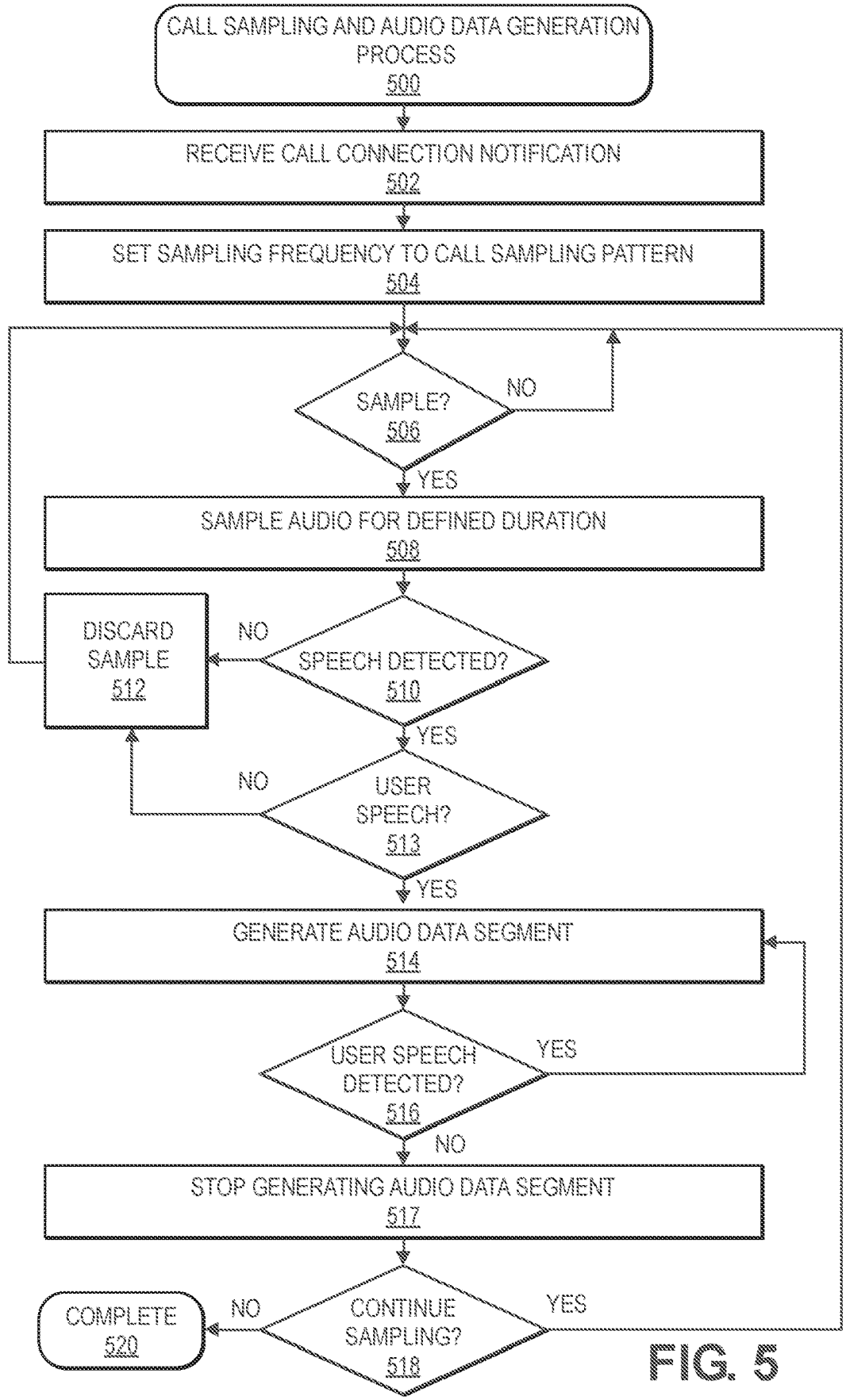
FIG. 5 is an example call sampling and audio data generation process, in accordance with described implementations.

FIG. 5 is an example call sampling and audio data generation process 500, in accordance with described implementations.

The example process 500 begins upon receipt of a call connection notification, as in 502. Upon receipt of the call connection notification, the sample frequency of the wearable device is set to the call sampling pattern, as in 504. As discussed above, the call sampling pattern may sample for audio that includes speech of the user at a high frequency than is typically sampled (normal sampling pattern) because the user is known to be participating in a call and the potential for the user talking during the call is more likely. For example, the frequency may be every two minutes. In other examples, the frequency may be higher or lower.

In accordance with the call sampling pattern, a determination is made as to whether audio is to be sampled, as in 506. If it is determined that audio is to be sampled, the audio collected by one or more microphones of the wearable device is sampled for a defined duration, as in 508. The defined duration may be any duration of time, such as ten seconds. In other implementations, the duration may be shorter or longer. If it is determined that the audio data is not to be sampled at decision block 506, the example process stays at decision block 506 until it is determined that the audio is to be sampled.

The sample of audio is then processed, as discussed herein, and a determination made as to whether the audio sample includes speech, as in 510. If it is determined that speech is not detected in the audio sample, the audio sample is discarded, as in 512, and the example process returns to decision block 506 and continues. If it is determined that the audio does include speech, the audio sample may be further processed to determine if the speech corresponds to speech of the user associated with the computing device or the wearable device, as in 513. For example, as discussed further below, a speech identification module may process the speech to determine if the speech corresponds to speech of the user. For example, the speech identification module may compare the speech with user profile data that includes information/features determined from speech provided by the user during an enrollment process. If it is determined that the speech is not speech of the user, the audio sample is discarded, as in 512.

If it is determined that the audio sample does include speech of the user, an audio data segment is generated that is representative of that audio sample, as in 514. As the audio data segment is generated, sampling of the audio continues to determine when the user stops speaking and a determination is made as to whether the user speech is continued to be detected, as in 516. If the user speech continues to be detected in the audio, the example process 500 returns to block 514 and generation of the audio data to include the speech of the user continues. If it is determined that the speech of the user is no longer detected in the audio, the generation of the audio data segment is completed, as in 517.

A determination is made as to whether sampling is to continue, as in 518. For example, even though it may be determined that the user is not speaking, if the call continues it can be expected that the user may being speaking again during the call. Sampling may continue until a call disconnection notification is detected. If it is determined that audio sampling is to continue, the example process 500 returns to block 506 and continues. However, if it is determined that audio sampling is not to continue, the example process 500 completes, as in 520.

Figure 6:
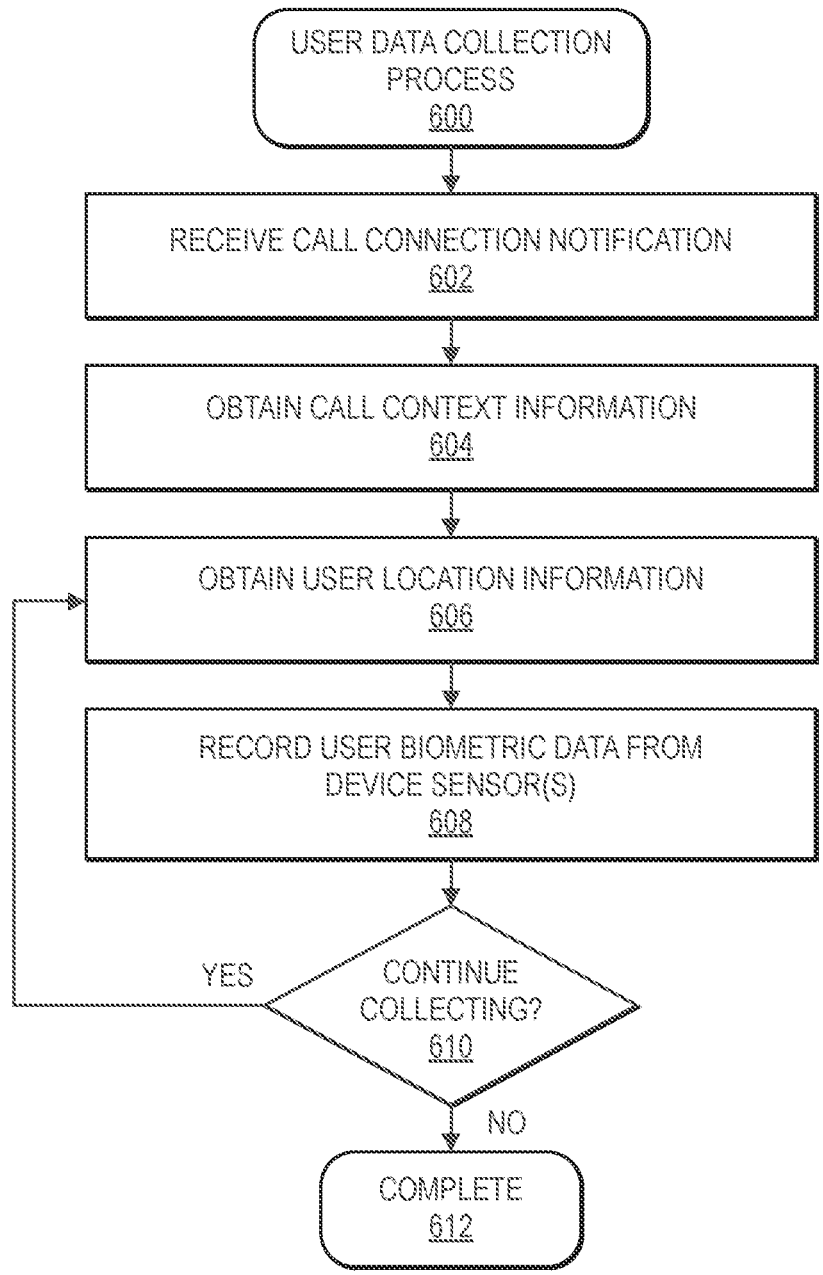
FIG. 6 is an example user data collection process, in accordance with described implementations.

FIG. 6 is an example user data collection process 600, in accordance with described implementations. As discussed above, in addition to determining sentiment(s) of a user during a call, other user data, such as the context of the call, the location of the user during the call, the time of day of the call, the duration, of the call user biometrics measured during the call, etc., may also be determined and presented to the user.

The example process 600 begins upon receipt of a call connection notification, as in 602. In response to the call connection notification, call context may be determined, as in 604. Call context may include, but is not limited to, the subject or purpose of the call, participants believed to be participating in the call, etc. Call context may be determined from other sources, such as an electronic calendar of the user and a meeting scheduled on the electronic calendar during the time of the call. Alternatively, or in addition thereto, the user may provide call context information.

In addition to or as an alternative to call context, the location of the user during the call may be determined, as in 606. User location may be determined, for example, based on positioning information determined from one or more sensors (such as a GPS sensor) of the computing device and/or the wearable device of the user, based on the wireless network to which the computing device and/or the wearable device is connected, etc. In addition, user biometrics may also be recorded from sensors of the wearable device when worn by the user during the call, as in 608. As discussed, user biometrics may include, but are not limited to, one or more of heart rate, blood pressure, body temperate, core temperature, blood oxygen level, movement, etc. Call context, user location, and user biometrics are collectively referred to herein as user data.

As the user data is collected a determination is made as to whether collection of the user data is to continue, as in 610. In some implementations, collection of user data may continue until a call disconnection is determined. If it is determined that user data collection is to continue, the example process 600 returns to block 606 and continues. If user data collection is not to continue, the example process completes, as in 612.

Figure 7:
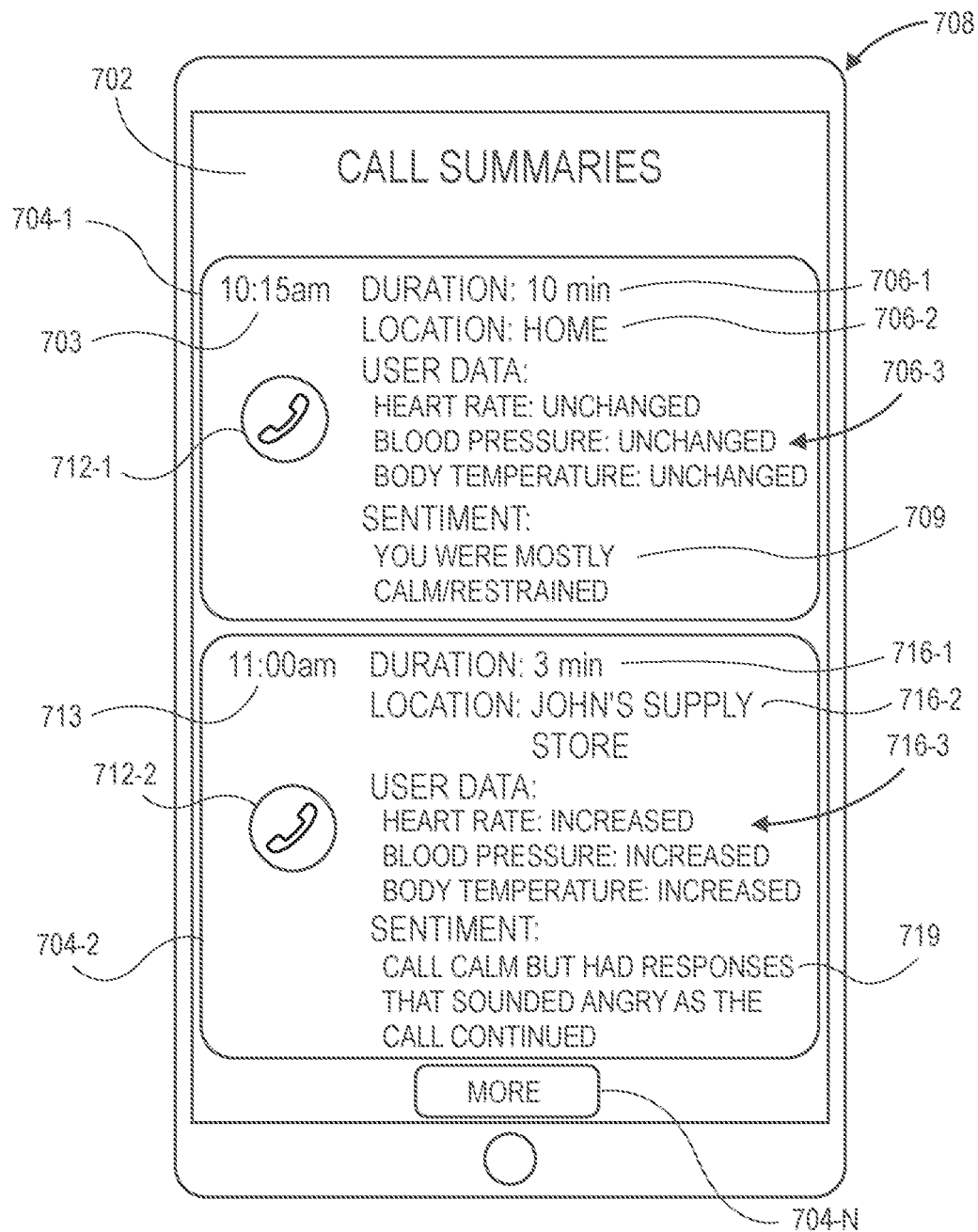
FIG. 7 is an example presentation of call summaries, in accordance with described implementations.

FIG. 7 is an example presentation of call summaries 702, in accordance with described implementations.

Call summaries 702 may be determined from the determined sentiments, user data, and/or other information collected by a wearable device or computing device of a user during one or more calls.

In the illustrated example, the call summaries 702 may be presented on a display of a computing device 708. In other examples, the call summaries 702 may be display or presented by other devices. In the illustrated example, two call summaries 704-1, 704-2 are presented. In other implementations, additional or fewer call summaries may be presented. Likewise, in this example, the user may view additional call summaries upon selection of the "More" control 704-N.

Each call summary may include information about the represented call. For example, the first call summary 704-1 indicates the time 703 at which the call started, the duration 706-1 of the call, the location of the user during the call 706-2, the user biometrics measured during the call 706-3, and the sentiment(s) of the user 709 determined based on speech of the user during the call. Likewise, the call summary 704-1 may include a call icon 712-1 indicating that the summary corresponds to a call.

Similar to the first call summary 704-1, the second call summary 704-2 indicates the time 713 at which the call started, the duration 716-1 of the call, the location of the user during the call 716-2, the user biometrics measured during the call 716-3, and the sentiment(s) of the user 719 determined based on speech of the user during the call. Likewise, the call summary 704-2 may include a call icon 712-2 indicating that the summary corresponds to a call.

Figure 8:
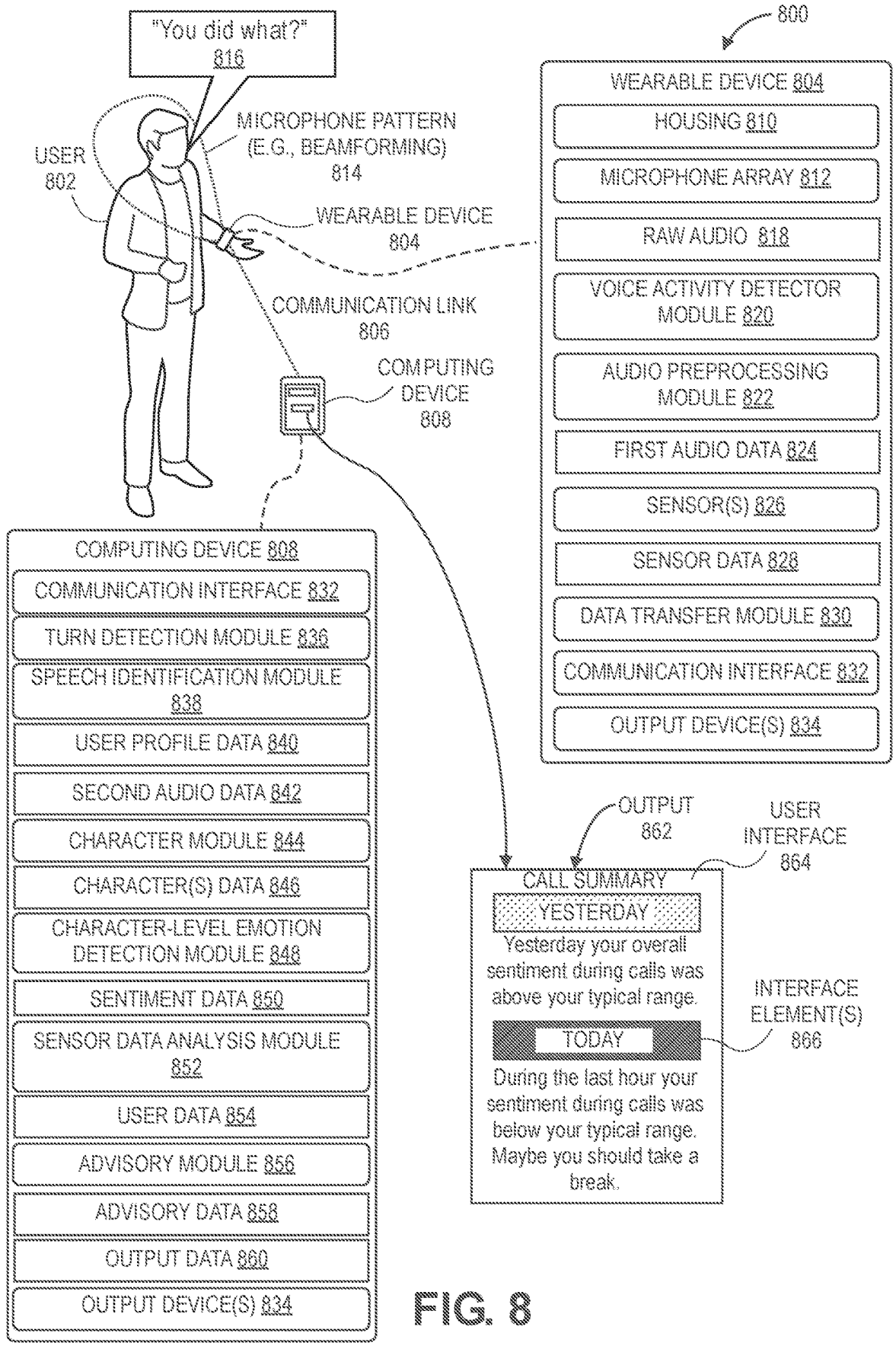
FIG. 8 is an illustrative system that processes speech of a user to determine sentiment data that is indicative of an emotional state as conveyed by the speech and presenting output related to that sentiment data, in accordance with described implementations.

FIG. 8 is an illustrative system 800 that processes speech of a user during a call to determine sentiment data that is indicative of an emotional state as conveyed by the speech and presenting output related to that sentiment data, according to one implementation.

The user 802 may have one or more wearable devices 804 on or about their person. The wearable device 804 may be implemented in various physical form factors including, but not limited to, the following: hats, headbands, necklaces, pendants, brooches, armlets, brassards, bracelets, wristbands, and so forth. In this illustration, the wearable device 804 is depicted as a wristband.

The wearable device 804 may use a communication link 806 to maintain communication with a computing device 808. For example, the computing device 808 may include a phone, tablet computer, personal computer, internet enabled device, voice activated device, smart-home device, and so forth. The communication link 806 may implement at least a portion of the Bluetooth Low Energy specification and/or other forms of wireless communication.

The wearable device 804 includes a housing 810. The housing 810 comprises one or more structures that support a microphone array 812. For example, the microphone array 812 may comprise two or more microphones arranged to acquire sound from ports at different locations through the housing 810. As described below, a microphone pattern 814 may provide gain or directivity using a beamforming algorithm. Speech 816 by the user 802 during a call and within range of the microphone array 812 may be detected by the microphone array 812 and audio 818 may be acquired. In other implementations, raw audio 818 may be acquired from other devices.

A voice activity detector module 820 may be used to process the raw audio 818 and determine if speech 816 is present. For example, the microphone array 812 may obtain raw audio 818 that contains ambient noises such as traffic, wind, and so forth. Raw audio 818 that is not deemed to contain speech 816 may discarded. Resource consumption is minimized by discarding raw audio 818 that does not contain speech 816. For example, power consumption, demands for memory and computational resources, communication bandwidth, and so forth are minimized by limiting further processing of raw audio 818 determined to not likely contain speech 816.

The voice activity detector module 820 may use one or more techniques to determine voice activity. For example, characteristics of the signals present in the raw audio 818 such as frequency, energy, zero-crossing rate, and so forth may be analyzed with respect to threshold values to determine characteristics that are deemed likely to be human speech.

Once at least a portion of the raw audio 818 has been determined to contain speech 816, an audio preprocessing module 822 may further process this portion to determine if the speech corresponds to speech of the user and, if so, include the speech in the first audio data 824. In some implementations, the audio preprocessing module 822 may apply one or more beamforming algorithms, noise reduction algorithms, filters, and so forth to determine the first audio data 824. For example, the audio preprocessing module 822 may use a beamforming algorithm to provide directivity or gain and improve the signal to noise ratio (SNR) of the speech 816 from the user 802 with respect to speech 816 or noise from other sources.

The wearable device 804 may include one or more sensors 826 that generate sensor data 828. For example, the sensors 826 may include accelerometers, pulse oximeters, and so forth. The sensors 826 are discussed in more detail with regard to FIG. 9.

The audio preprocessing module 822 may use information from one or more sensors 826 during operation. For example, sensor data 828 from an accelerometer may be used to determine orientation of the wearable device 804. Based on the orientation, the beamforming algorithm may be operated to provide a microphone pattern 814 that includes a location where the user's 802 head is expected to be.

A data transfer module 830 may use a communication interface 832 to send the first audio data 824, sensor data 828, or other data to the computing device 808 using the communication link 806. For example, the data transfer module 830 may determine that a memory within the wearable device 804 has reached a predetermined quantity of stored first audio data 824. The communication interface 832 may comprise a Bluetooth Low Energy device that is operated responsive to commands from the data transfer module 830 to send the stored first audio data 824 to the computing device 808.

In some implementations, the first audio data 824 may be encrypted prior to transmission over the communication link 806. The encryption may be performed prior to storage in the memory of the wearable device 804, prior to transmission via the communication link 806, or both.

Communication between the wearable device 804 and the computing device 808 may be persistent or intermittent. For example, the wearable device 804 may determine and store first audio data 824 even while the communication link 806 to the computing device 808 is unavailable. At a later time, when the communication link 806 is available, the first audio data 824 may be sent to the computing device 808.

The wearable device 804 may include one or more output devices 834. For example, the output devices 834 may include a light emitting diode, haptic output device, speaker, and so forth. The output devices 834 are described in more detail with regard to FIG. 9.

The computing device 808 may include a communication interface 832. For example, the communication interface 832 of the computing device 808 may comprise a Bluetooth Low Energy device, a Wi-Fi network interface device, and so forth. The computing device 808 receives the first audio data 824 from the wearable device 804 via the communication link 806.

The computing device 808 may use a turn detection module 836 to determine that portions of the first audio data 824 are associated with different speakers. For example, when more than one person is speaking a "turn" is a contiguous portion of speech by a single person. A first turn may include several sentences spoken by a first person, while a second turn includes a response by the second person. The turn detection module 836 may use one or more characteristics in the first audio data 824 to determine that a turn has taken place. For example, a turn may be detected based on a pause in speech 816, change in pitch, change in signal amplitude, and so forth. For example, if the pause between words exceeds 350 milliseconds, data indicative of a turn may be determined. In other examples, the pause may be greater or less than 350 milliseconds.

In some implementations the turn detection module 836 may process segments of the first audio data 824 to determine if the person speaking at the beginning of the segment is the same as the person speaking at the end. The first audio data 824 may be divided into segments and subsegments. For example, each segment may be six seconds long with a first subsegment that includes a beginning two seconds of the segment and a second subsegment that includes the last two seconds of the segment. The data in the first subsegment is processed to determine a first set of features and the data in the second subsegment is processed to determine a second set of features. Segments may overlap, such that at least some data is duplicated between successive segments. If the first set of features and the second set of features are determined to be within a threshold value of one another, they may be deemed to have been spoken by the same person. If the first set of features and the second set of features are not within the threshold value of one another, they may be deemed to have been spoken by different people. A segment that includes speech from two different people may be designated as a break between one speaker and another. In this implementation, those breaks between speakers may be used to determine the boundaries of a turn. For example, a turn may be determined to begin and end when a segment includes speech from two different people.

In some implementations the turn detection module 836 may operate in conjunction with, or as part of, a speech identification module 838, as described below. For example, if the speech identification module 838 identifies that a first segment is spoken by a first user and a second segment is spoken by a second user, data indicative of a turn may be determined.

The speech identification module 838 may access user profile data 840 to determine if the first audio data 824 is associated with the user 802. For example, user profile data 840 may comprise information about speech 816 provided by the user 802 during an enrollment process. During enrollment, the user 802 may provide a sample of their speech 816 which is then processed to determine features that may be used to identify if speech 816 is likely to be from that user 802.

The speech identification module 838 may process at least a portion of the first audio data 824 that is designated as a particular turn to determine if the user 802 is the speaker. For example, the first audio data 824 of the first turn may be processed by the speech identification module 838 to determine a confidence level of 0.97 that the first turn is the user 802 speaking. A threshold confidence value of 0.95 may be specified. Continuing the example, the first audio data 824 of the second turn may be processed by the speech identification module 838 that determines a confidence level of 0.17 that the second turn is the user 802 speaking.

Second audio data 842 is determined that comprises the portion(s) of the first audio data 824 that is determined to be speech 816 from the user 802. For example, the second audio data 842 may consist of the speech 816 which exhibits a confidence level greater than the threshold confidence value of 0.95. As a result, the second audio data 842 omits speech 816 from other sources, such as someone who is in conversation with the user 802 or another talking person that is near the user.

While the illustrated example shows processing with the turn detection module 836, the speech identification module 838, user profile data 840, and second audio data 842 on the computing device and processing of the speech occurring on the computing device, in other implementations, some or all of the turn detection module 836, speech identification module 838, user profile data 840 and/or the second audio data may be included on the wearable device 804 and speech processed on the wearable device.

A character module 844 uses the second audio data 842 to determine character data 846 from the second audio data 842. For example, the character module 844 may use one or more systems such as signal analysis, classifiers, neural networks, and so forth to generate the character data 846. The character data 846 may comprise values, vectors, and so forth. For example, the character module 844 may use a convolutional neural network that accepts as input the second audio data 842 and provides as output character data that includes characters corresponding to the second audio data 842.

A character-level emotion detection ("CED") module 848, also referred to herein as a CED network, uses the character data 846 to determine sentiment data 850. Human speech involves a complex interplay of biological systems on the part of the person speaking. The character analysis module 848 determines the sentiment data 850 that is indicative of a possible emotional state of the user 802 based on the character data 846. The character module 848 may determine various values that are deemed to be representative of emotional state.

As discussed herein, use of character data and the described CED network reduces computation requirements and also avoids the need for an analysis of the words spoken and/or their meaning. For example, the described implementations do not need an automated speech recognition (ASR) system to determine the text of the spoken words.

The sentiment data 850 determined by the character module 848 may be expressed as one or more numeric values, vectors, words, and so forth. For example, the sentiment data 850 may comprise a composite single value, such as a numeric value, color, and so forth. For example, a weighted sum of the valence, activation, and dominance values may be used to generate an overall sentiment index or "tone value" or "mood value." In another example, the sentiment data 850 may comprise one or more vectors in an n-dimensional space. In yet another example, the sentiment data 850 may comprise associated words that are determined by particular combinations of other values, such as valence, activation, and dominance values. The sentiment data 850 may comprise values that are non-normative. For example, a sentiment value that is expressed as a negative number may not be representative of an emotion that is considered to be bad.

The computing device 808 may include a sensor data analysis module 852. The sensor data analysis module 852 may process the sensor data 828 and generate user data 854. For example, the sensor data 828 obtained from sensors 826 on the wearable device 804 may comprise information about movement obtained from an accelerometer, pulse rates obtained from a pulse oximeter, and so forth. The user data 854 may comprise information such as total movement by the wearable device 804 during particular time intervals (e.g., during a call), pulse rates during particular time intervals, and so forth. The user data 854 may provide information that is representative of the physiological state of the user 802.

An advisory module 856 may use the sentiment data 850 and the user data 854 to determine advisory data 858. The sentiment data 850 and the user status 854 may each include timestamp information and/or, as noted above, may be associated with a single call interaction. Sentiment data 850 for a first time period may be associated with user data 854 for a second time period. Historical data may be used to determine trends. These trends may then be used by the advisory module 856 to determine advisory data 858. For example, trend data may indicate that when the user data 854 indicates that when the user has five or more calls during a single day the user's overall tone value is below their personal baseline value as the calls progress. As a result, the advisory module 856 may generate advisory data 858 to inform the user 802 of this and suggest fewer calls during the day or breaks between the calls.

In some implementations the advisory data 858 may include speech recommendations. These speech recommendations may include suggestions as to how the user 802 may manage their speech to change or moderate the apparent emotion presented by their speech. In some implementations, the speech recommendations may advise the user 802 to speak more slowly, pause, breath more deeply, suggest a different tone of voice, and so forth. For example, if the sentiment data 850 indicates that the user 802 appears to have been upset, the advisory data 858 may be for the user 802 to stop speaking for ten seconds and then continue speaking in a calmer voice. In some implementations the speech recommendations may be associated with particular goals. For example, the user 802 may wish to sound more assertive and confident during the calls. The user 802 may provide input that indicates these goals, with that input used to set minimum threshold values for use by the advisory module 856. The advisory module 856 may analyze the sentiment data 850 for different calls with respect to these minimum threshold values to provide the advisory data 858. Continuing the example, if the sentiment data 850 indicates that the speech of the user 802 was below the minimum threshold values, the advisory data 858 may inform the user 802 and may also suggest actions.

The computing device 808 may generate output data 860 from one or more of the sentiment data 850 or the advisory data 858. For example, the output data 860 may comprise hypertext markup language (HTML) instructions that, when processed by a browser engine, generate an image of a graphical user interface (GUI). In another example, the output data 860 may comprise an instruction to play a particular sound, operate a buzzer, or operate a light to present a particular color at a particular intensity.

The output data 860 may then be used to operate one or more output devices 834. Continuing the examples, the GUI may be presented on a display device, a buzzer may be operated, the light may be illuminated, and so forth to provide output 862. The output 862 may include a user interface 864, such as the GUI depicted in FIG. 8 or any other user interface illustrated in FIGS. 2, 3, and 7 that provides information about the sentiment of the user during one or more calls using several interface elements 866. In this example, the sentiment is presented as an indication of sentiments of the user determined for calls occurring during a period of time (e.g., yesterday and today). In some implementations, the sentiment may be expressed as numeric values and interface elements 866 with particular colors associated with those numeric values may be presented in the user interface. For example, if the sentiment of the user 802 has one or more values that exceed the user's 802 typical range for a metric associated with being happy, an interface element 866 colored green may be presented. In contrast, if the sentiment of the user 802 has one or more values that are below the user's 802 typical range, an interface element 866 colored blue may be presented. The typical range may be determined using one or more techniques. For example, the typical range may be based on minimum sentiment values, maximum sentiment values, may be specified with respect to an average or linear regression line, and so forth.

The system may provide output 862 based on data obtained over various time intervals and/or over various calls. For example, the user interface 864 illustrates sentiment for yesterday and today for calls occurring during those time periods. The system 800 may present information about sentiment associated with other periods of time.

It is understood that the various functions, modules, and operations described in this system 800 may be performed by other devices. For example, the advisory module 856 may execute on a server.

Figure 9:
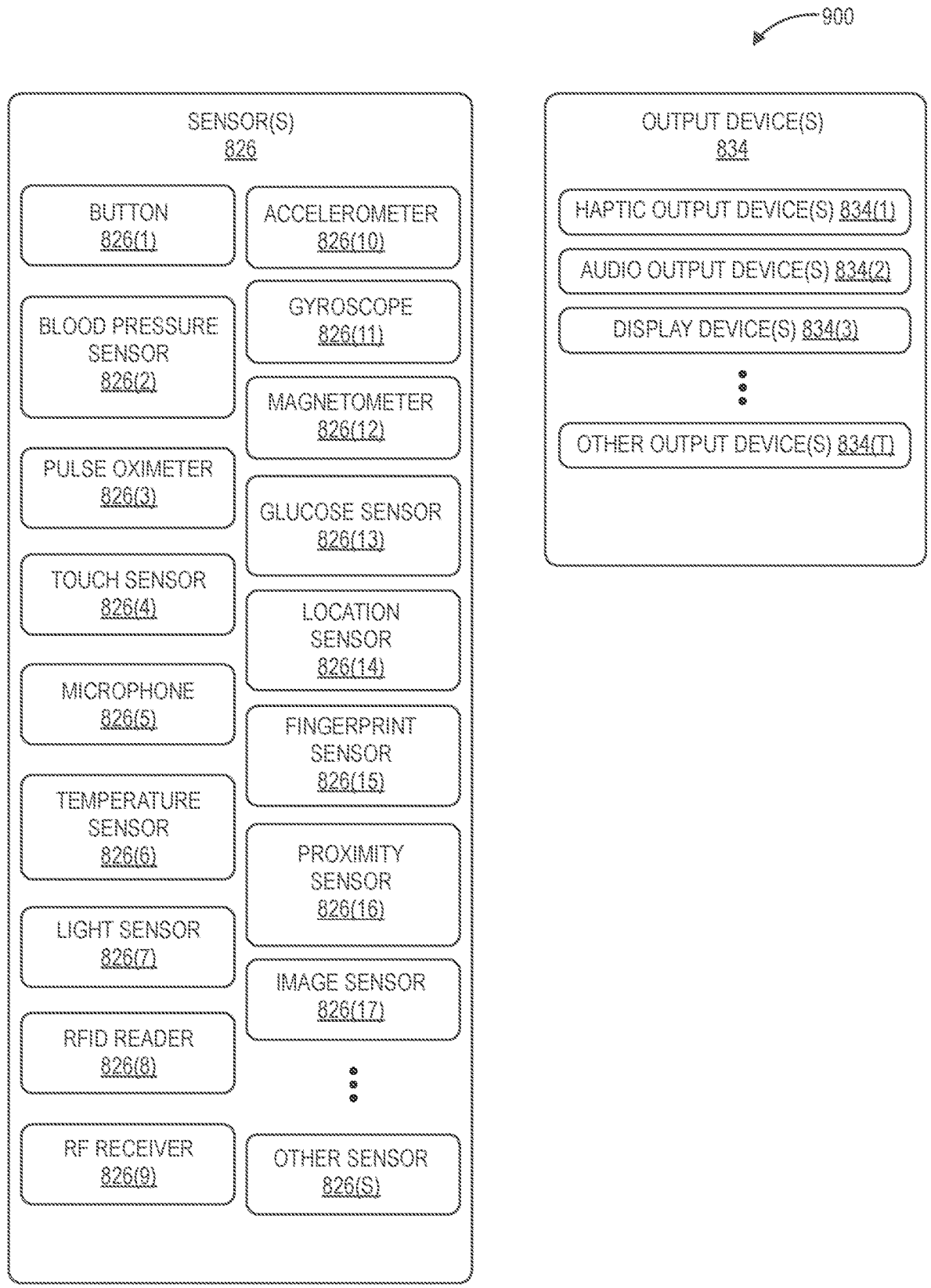
FIG. 9 illustrates a block diagram of sensors and output devices that may be used during operation of the system, in accordance with described implementations.

FIG. 9 illustrates a block diagram 900 of sensors 826 and output devices 834 that may be used by the wearable device 804, the computing device 808, or other devices during operation of the system 800, according to one implementation. As described above, the sensors 826 may generate sensor data 828.

The one or more sensors 826 may be integrated with or internal to a computing device, such as the wearable device 804, the computing device 808, and so forth. For example, the sensors 826 may be built-in to the wearable device 804 during manufacture. In other implementations, the sensors 826 may be part of another device. For example, the sensors 826 may comprise a device external to, but in communication with, the computing device 808 and/or the wearable device using Bluetooth, Wi-Fi, 3G, 4G, LTE, ZigBee, Z-Wave, or another wireless or wired communication technology.

The one or more sensors 826 may include one or more buttons 826(1) that are configured to accept input from the user 802. The buttons 826(1) may comprise mechanical, capacitive, optical, or other mechanisms. For example, the buttons 826(1) may comprise mechanical switches configured to accept an applied force from a touch of the user 802 to generate an input signal. In some implementations, input from one or more sensors 826 may be used to initiate acquisition of the raw audio 818. For example, activation of a button 826(1) may initiate acquisition of the raw audio 818.

A blood pressure sensor 826(2) may be configured to provide sensor data 828 that is indicative of the user's 802 blood pressure. For example, the blood pressure sensor 826(2) may comprise a camera that acquires images of blood vessels and determines the blood pressure by analyzing the changes in diameter of the blood vessels over time. In another example, the blood pressure sensor 826(2) may comprise a sensor transducer that is in contact with the skin of the user 802 that is proximate to a blood vessel.

A pulse oximeter 826(3) may be configured to provide sensor data 828 that is indicative of a cardiac pulse rate and data indicative of oxygen saturation of the user's 802 blood. For example, the pulse oximeter 826(3) may use one or more light emitting diodes (LEDs) and corresponding detectors to determine changes in apparent color of the blood of the user 802 resulting from oxygen binding with hemoglobin in the blood, providing information about oxygen saturation. Changes over time in apparent reflectance of light emitted by the LEDs may be used to determine cardiac pulse.

The sensors 826 may include one or more touch sensors 826(4). The touch sensors 826(4) may use resistive, capacitive, surface capacitance, projected capacitance, mutual capacitance, optical, Interpolating Force-Sensitive Resistance ("IFSR"), or other mechanisms to determine the position of a touch or near-touch of the user 802. For example, the IFSR may comprise a material configured to change electrical resistance responsive to an applied force. The location within the material of that change in electrical resistance may indicate the position of the touch.

One or more microphones 826(5) may be configured to acquire information about sound present in the environment. In some implementations, a plurality of microphones 826(5) may be used to form the microphone array 812. As described above, the microphone array 812 may implement beamforming techniques to provide for directionality of gain.

A temperature sensor (or thermometer) 826(6) may provide information indicative of a temperature of an object. The temperature sensor 826(6) in the computing device may be configured to measure ambient air temperature proximate to the user 802, the body temperature of the user 802, and so forth. The temperature sensor 826(6) may comprise a silicon bandgap temperature sensor, thermistor, thermocouple, or other device. In some implementations, the temperature sensor 826(6) may comprise an infrared detector configured to determine temperature using thermal radiation.

The sensors 826 may include one or more light sensors 826(7). The light sensors 826(7) may be configured to provide information associated with ambient lighting conditions such as a level of illumination. The light sensors 826(7) may be sensitive to wavelengths including, but not limited to, infrared, visible, or ultraviolet light. In contrast to a camera, the light sensor 826(7) may typically provide a sequence of amplitude (magnitude) samples and color data while the camera provides a sequence of two-dimensional frames of samples (pixels).

One or more radio frequency identification (RFID) readers 826(8), near field communication (NFC) systems, and so forth, may also be included as sensors 826. The user 802, objects around the computing device, locations within a building, and so forth, may be equipped with one or more radio frequency (RF) tags. The RF tags are configured to emit an RF signal. In one implementation, the RF tag may be a RFID tag configured to emit the RF signal upon activation by an external signal. For example, the external signal may comprise a RF signal or a magnetic field configured to energize or activate the RFID tag. In another implementation, the RF tag may comprise a transmitter and a power source configured to power the transmitter. For example, the RF tag may comprise a Bluetooth Low Energy ("BLE") transmitter and battery. In other implementations, the tag may use other techniques to indicate its presence. For example, an acoustic tag may be configured to generate an ultrasonic signal, which is detected by corresponding acoustic receivers. In yet another-implementation, the tag may be configured to emit an optical signal.

One or more RF receivers 826(9) may also be included as sensors 826. In some implementations, the RF receivers 826(9) may be part of transceiver assemblies. The RF receivers 826(9) may be configured to acquire RF signals associated with Wi-Fi, Bluetooth, ZigBee, Z-Wave, 3G, 4G, LTE, or other wireless data transmission technologies. The RF receivers 826(9) may provide information associated with data transmitted via radio frequencies, signal strength of RF signals, and so forth. For example, information from the RF receivers 826(9) may be used to facilitate determination of a location of the computing device, and so forth.

The sensors 826 may include one or more accelerometers 826(10). The accelerometers 826(10) may provide information such as the direction and magnitude of an imposed acceleration, tilt relative to local vertical, and so forth. Data such as rate of acceleration, determination of changes in direction, speed, tilt, and so forth, may be determined using the accelerometers 826(10).

A gyroscope 826(11) provides information indicative of rotation of an object affixed thereto. For example, the gyroscope 826(11) may indicate whether the device has been rotated.

A magnetometer 826(12) may be used to determine an orientation by measuring ambient magnetic fields, such as the terrestrial magnetic field. For example, output from the magnetometer 826(12) may be used to determine whether the device containing the sensor 826, such as the computing device 808, has changed orientation or otherwise moved. In other implementations, the magnetometer 826(12) may be configured to detect magnetic fields generated by another device.

A glucose sensor 826(13) may be used to determine a concentration of glucose within the blood or tissues of the user 802. For example, the glucose sensor 826(13) may comprise a near infrared spectroscope that determines a concentration of glucose or glucose metabolites in tissues. In another example, the glucose sensor 826(13) may comprise a chemical detector that measures presence of glucose or glucose metabolites at the surface of the user's skin.

A location sensor 826(14) is configured to provide information indicative of a location. The location may be relative or absolute. For example, a relative location may indicate "kitchen," "bedroom," "conference room," and so forth. In comparison, an absolute location is expressed relative to a reference point or datum, such as a street address, geolocation comprising coordinates indicative of latitude and longitude, grid square, and so forth. The location sensor 826(14) may include, but is not limited to, radio navigation-based systems such as terrestrial or satellite-based navigational systems. The satellite-based navigation system may include one or more of a Global Positioning System ("GPS") receiver, a Global Navigation Satellite System ("GLONASS") receiver, a Galileo receiver, a BeiDou Navigation Satellite System ("BDS") receiver, an Indian Regional Navigational Satellite System, and so forth. In some implementations, the location sensor 826(14) may be omitted or operate in conjunction with an external resource such as a cellular network operator providing location information, or Bluetooth beacons.

A fingerprint sensor 826(15) is configured to acquire fingerprint data. The fingerprint sensor 826(15) may use an optical, ultrasonic, capacitive, resistive, or other detector to obtain an image or other representation of features of a fingerprint. For example, the fingerprint sensor 826(15) may comprise a capacitive sensor configured to generate an image of the fingerprint of the user 802.

A proximity sensor 826(16) may be configured to provide sensor data 828 indicative of one or more of a presence or absence of an object, a distance to the object, or characteristics of the object. The proximity sensor 826(16) may use optical, electrical, ultrasonic, electromagnetic, or other techniques to determine a presence of an object. For example, the proximity sensor 826(16) may comprise a capacitive proximity sensor configured to provide an electrical field and determine a change in electrical capacitance due to presence or absence of an object within the electrical field.

An image sensor 826(17) comprises an imaging element to acquire images in visible light, infrared, ultraviolet, and so forth. For example, the image sensor 826(17) may comprise a complementary metal oxide (CMOS) imaging element or a charge coupled device (CCD).

The sensors 826 may include other sensors 826(S) as well. For example, the other sensors 826(S) may include strain gauges, anti-tamper indicators, and so forth. For example, strain gauges or strain sensors may be embedded within the wearable device 804 and may be configured to provide information indicating that at least a portion of the wearable device 804 has been stretched or displaced such that the wearable device 804 may have been donned or doffed.

In some implementations, the sensors 826 may include hardware processors, memory, and other elements configured to perform various functions. Furthermore, the sensors 826 may be configured to communicate by way of a network or may couple directly with the other devices.

The computing device may include or may couple to one or more output devices 834. The output devices 834 are configured to generate signals which may be perceived by the user 802, detectable by the sensors 826, or a combination thereof.

Haptic output devices 834(1) are configured to provide a signal, which results in a tactile sensation to the user 802. The haptic output devices 834(1) may use one or more mechanisms such as electrical stimulation or mechanical displacement to provide the signal. For example, the haptic output devices 834(1) may be configured to generate a modulated electrical signal, which produces an apparent tactile sensation to the user 802. In another example, the haptic output devices 834(1) may comprise piezoelectric or rotary motor devices configured to provide a vibration that may be felt by the user 802.

One or more audio output devices 834(2) are configured to provide acoustic output. The acoustic output includes one or more of infrasonic sound, audible sound, or ultrasonic sound. The audio output devices 834(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output by an audio output device 834(2).

The display devices 834(3) may be configured to provide output that may be seen by the user 802 or detected by a light-sensitive detector such as the image sensor 826(17) or light sensor 826(7). The output may be monochrome or color. The display devices 834(3) may be emissive, reflective, or both. An emissive display device 834(3), such as using LEDs, is configured to emit light during operation. In comparison, a reflective display device 834(3), such as using an electrophoretic element, relies on ambient light to present an image. Backlights or front lights may be used to illuminate non-emissive display devices 834(3) to provide visibility of the output in conditions where the ambient light levels are low.

The display mechanisms of display devices 834(3) may include, but are not limited to, micro-electromechanical systems ("MEMS"), spatial light modulators, electroluminescent displays, quantum dot displays, liquid crystal on silicon ("LCOS") displays, cholesteric displays, interferometric displays, liquid crystal displays, electrophoretic displays, LED displays, and so forth. These display mechanisms are configured to emit light, modulate incident light emitted from another source, or both. The display devices 834(3) may operate as panels, projectors, and so forth.

The display devices 834(3) may be configured to present images. For example, the display devices 834(3) may comprise a pixel-addressable display. The image may comprise at least a two-dimensional array of pixels or a vector representation of at least two-dimensional image.

In some implementations, the display devices 834(3) may be configured to provide non-image data, such as text or numeric characters, colors, and so forth. For example, a segmented electrophoretic display device 834(3), segmented LED, and so forth, may be used to present information such as letters or numbers. The display devices 834(3) may also be configurable to vary the color of the segment, such as using multicolor LED segments.

Other output devices 834(T) may also be present. For example, the other output devices 834(T) may include scent dispensers.

Figure 10:
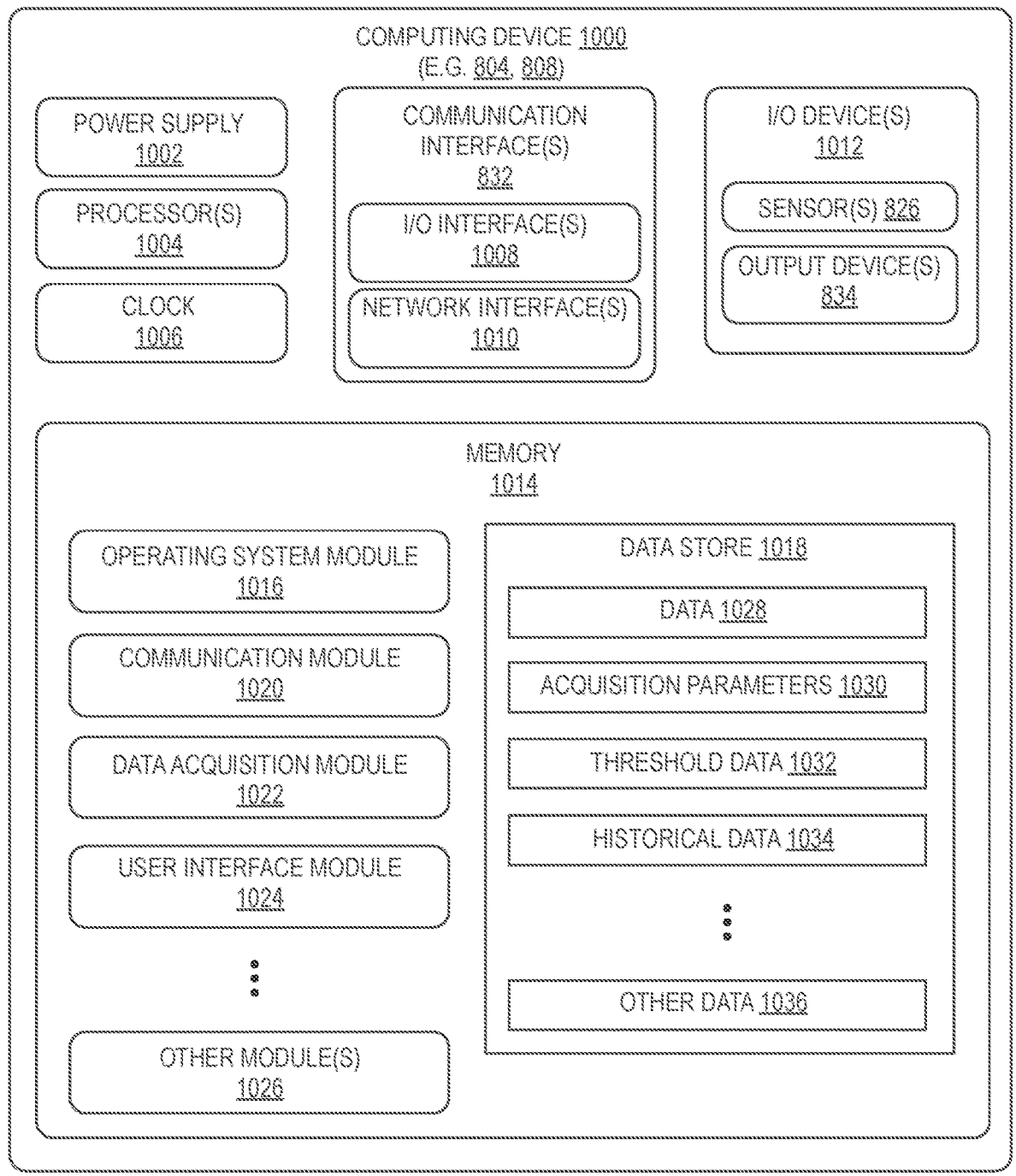
FIG. 10 illustrates a block diagram of a computing device(s) such as a wearable device, smartphone, or other devices, in accordance with described implementations.

FIG. 10 illustrates a block diagram of a computing device 1000 configured to support operation of the systems discussed herein. As described above, the computing device 1000 may be the wearable device 804, the computing device 808, and so forth.

One or more power supplies 1002 are configured to provide electrical power suitable for operating the components in the computing device 1000. In some implementations, the power supply 1002 may comprise a rechargeable battery, fuel cell, photovoltaic cell, power conditioning circuitry, wireless power receiver, and so forth.

The computing device 1000 may include one or more hardware processors 1004 (processors) configured to execute one or more stored instructions. The processors 1004 may comprise one or more cores. One or more clocks 1006 may provide information indicative of date, time, ticks, and so forth. For example, the processor 1004 may use data from the clock 1006 to generate a timestamp, trigger a preprogrammed action, and so forth.

The computing device 1000 may include one or more communication interfaces 832 such as input/output (I/O) interfaces 1008, network interfaces 1010, and so forth. The communication interfaces 832 enable the computing device 1000, or components thereof, to communicate with other devices or components. The communication interfaces 832 may include one or more I/O interfaces 1008. The I/O interfaces 1008 may comprise interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 1008 may couple to one or more I/O devices 1012. The I/O devices 1012 may include input devices such as one or more of the sensors 826. The I/O devices 1012 may also include output devices 834 such as one or more of an audio output device 834(2), a display device 834(3), and so forth. In some embodiments, the I/O devices 1012 may be physically incorporated with the computing device 1000 or may be externally placed.

The network interfaces 1010 are configured to provide communications between the computing device 1000 and other devices, such as the sensors 826, routers, access devices, and so forth. The network interfaces 1010 may include devices configured to couple to wired or wireless personal area networks ("PANs"), local area networks ("LANs"), wide area networks ("WANs"), and so forth. For example, the network interfaces 1010 may include devices compatible with Ethernet, Wi-Fi, Bluetooth, ZigBee, 4G, 5G, LTE, and so forth.

The computing device 1000 may also include one or more busses or other internal communications hardware or software that allow for the transfer of data between the various modules and components of the computing device 1000.

As shown in FIG. 10, the computing device 1000 includes one or more memories 1014. The memory 1014 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 1014 provides storage of computer-readable instructions, data structures, program modules, and other data for the operation of the computing device 1000. A few example functional modules are shown stored in the memory 1014, although the same functionality may alternatively be implemented in hardware, firmware, or as a system on a chip (SOC).

The memory 1014 may include at least one operating system (OS) module 1016. The OS module 1016 is configured to manage hardware resource devices such as the I/O interfaces 1008, the network interfaces 1010, the I/O devices 1012, and provide various services to applications or modules executing on the processors 1004. The OS module 1016 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; the Android operating system from Google Corporation of Mountain View, Calif., USA; the iOS operating system from Apple Corporation of Cupertino, Calif., USA; or other operating systems.

Also stored in the memory 1014 may be a data store 1018 and one or more of the following modules. These modules may be executed as foreground applications, background tasks, daemons, and so forth. The data store 1018 may use a flat file, database, linked list, tree, executable code, script, or other data structure to store information. In some implementations, the data store 1018 or a portion of the data store 1018 may be distributed across one or more other devices including the computing devices 1000, network attached storage devices, and so forth.

A communication module 1020 may be configured to establish communications with one or more of other computing devices 1000, the sensors 826, and so forth. The communications may be authenticated, encrypted, and so forth. The communication module 1020 may also control the communication interfaces 832.

The memory 1014 may also store a data acquisition module 1022. The data acquisition module 1022 is configured to acquire raw audio 818, sensor data 826, and so forth. In some implementations the data acquisition module 1022 may be configured to operate the one or more sensors 826, the microphone array 812, and so forth. For example, the data acquisition module 1022 may determine that the sensor data 828 satisfies a trigger event. The trigger event may comprise values of sensor data 828 for one or more sensors 826 exceeding a threshold value. For example, if pulse oximeter 826(3) on the wearable device 804 indicates that the pulse of the user 802 has exceeded a threshold value, the microphone array 812 may be operated to generate raw audio 818.

In another example, the data acquisition module 1022 on the wearable device 804 may receive instructions from the computing device 808 to obtain raw audio 818 at a specified interval, at a scheduled time, and so forth. For example, the computing device 808 may send instructions to acquire raw audio 818 for 60 seconds every 540 seconds. The raw audio 818 may then be processed with the voice activity detector module 820 to determine if speech 816 is present. If speech 816 is detected, the first audio data 824 may be generated and then sent to the computing device 808.

A user interface module 1024 provides a user interface using one or more of the I/O devices 1012. The user interface module 1024 may be used to obtain input from the user 802, present information to the user 802, and so forth. For example, the user interface module 1024 may present a graphical user interface on the display device 834(3) and accept user input using the touch sensor 826(4).

One or more other modules 1026, such as the voice activity detector module 820, the audio preprocessing module 822, the data transfer module 830, the turn detection module 836, the speech identification module 838, the audio feature module 844, the feature analysis module 848, the sensor data analysis module 852, the advisory module 856, and so forth may also be stored in the memory 1014.

Data 1028 may be stored in the data store 1018. For example, the data 1028 may comprise one or more of raw audio 818, first audio data 824, sensor data 828, user profile data 840, second audio data 842, sentiment data 850, user data 854, advisory data 858, output data 860, call interaction associations, etc.

One or more acquisition parameters 1030 may be stored in the memory 1014. The acquisition parameters 1030 may comprise parameters such as audio sample rate, audio sample frequency, audio frame size, and so forth.

Threshold data 1032 may be stored in the memory 1014. For example, the threshold data 1032 may specify one or more thresholds used by the voice activity detector module 820 to determine if the raw audio 818 includes speech 816.

The computing device 1000 may maintain historical data 1034. The historical data 1034 may be used to provide information about trends or changes over time. For example, the historical data 1034 may comprise an indication of sentiment data 850 on an hourly basis for the previous 90 days. In another example, the historical data 1034 may comprise user data 854 for the previous 90 days.

Other data 1036 may also be stored in the data store 1018.

In different implementations, different computing devices 1000 may have different capabilities or capacities. For example, the computing device 808 may have significantly more processor 1004 capability and memory 1014 capacity compared to the wearable device 804. In one implementation, the wearable device 804 may determine the first audio data 824 and send the first audio data 824 to the computing device 808. In another implementation, the wearable device 804 may generate the sentiment data 850, advisory data 858, and so forth. Other combinations of distribution of data processing and functionality may be used in other implementations.

Figure 11:
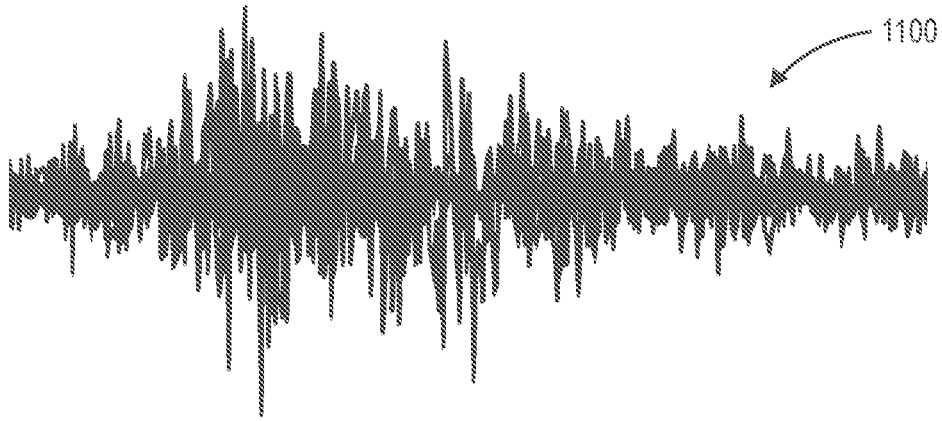
FIG. 11 illustrates a block diagram of the conversion of speech to sentiment data, in accordance with described implementations.
Figure 11:
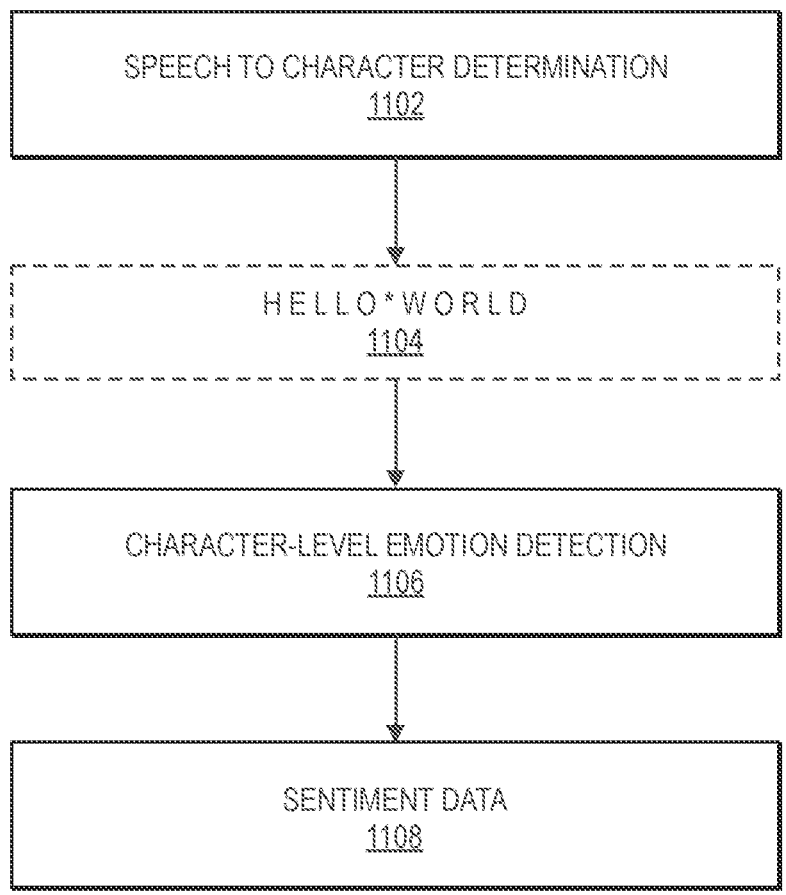

FIG. 11 illustrates a block diagram of the conversion of speech 1100 to sentiment data 1108, in accordance with described implementations.

Traditional systems utilize automatic speech recognition ("ASR") engines to process speech of a user and determine the words spoken by the user. Decoding words by ASR is computationally expensive, especially because a high-quality decoder usually needs a large language model and lexicon and a complex decoding algorithm. Additionally, the words decoded by ASR are not directly used by humans. Instead, words get converted to feature vectors using a large embedding matrix.

As illustrated in FIG. 11, rather than using a complex ASR, the disclosed implementations avoid decoding words and instead may use a greedy decoder, such as TensorFlow, to decode the audio to a sequence of spaces and characters. As discussed further below, speech 1100 from a user is processed by a greedy decoder to convert the speech into a sequence of spaces and characters 1102. For example, if the speech 1100 includes the statement "hello world" the decoder converts the speech into the sequence "H E L O * W O R L D", with * representing a space, as illustrated in block 1104. A CED network 1106 then processes the characters 1104 to determine sentiment data 1108 representative of the emotion of the user that generated the speech 1100.

Figure 12A:
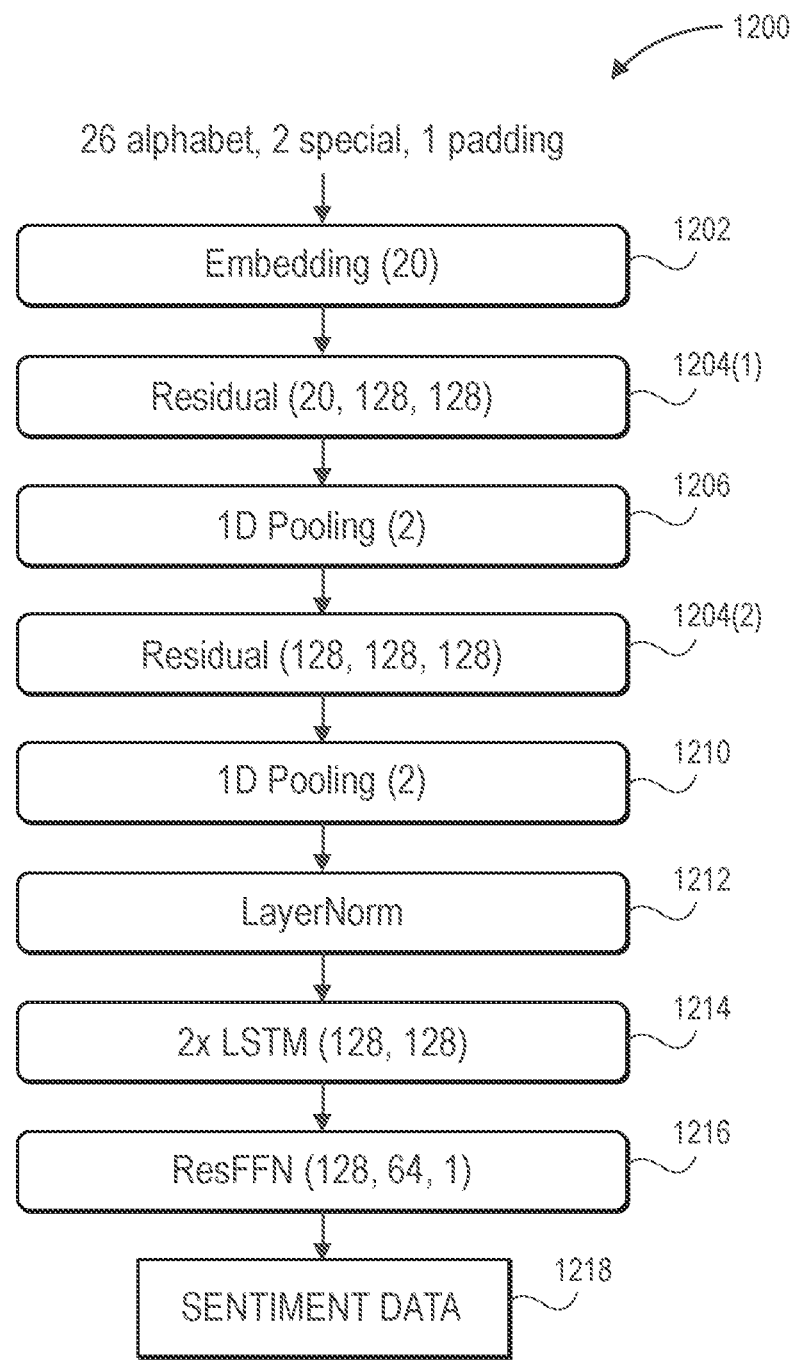
FIG. 12A illustrates a block diagram of a character-level emotion detection network used to convert an input into sentiment data, in accordance with described implementations.

FIG. 12A illustrates a block diagram of a CED network 1200 used to convert an input of character data into sentiment data, in accordance with described implementations. The CED network may be any type of neural network, such as a convolutional neural network, deep learning network, etc.

As illustrated in FIG. 12A, the CED network 1200 includes embedding layer 1202, followed by two residual blocks 1204(1), 1204(2), a normalization layer 1212, two layers of Long Short-Term Memory ("LSTM") 1214, and a residual fully connected layer 1216. In addition, there are pooling layers 1206 and 1210 following the residual layers 1204(1), 1204(2) to reduce the length of the input sequence and the amount of computations. In total, the input sequence length is reduced by a factor of four before the resulting sequence is fed to the LSTM layer 1214. The normalization layer 1212, which is optional in various implementations, improves the speed of the CED network 1200.

As illustrated in FIG. 12A, in some implementations, the CED network 1200 may be trained to receive an input sequence of character data that includes a twenty-nine dimensional probability vector—twenty-six alphabet characters, two special characters (space and apostrophe), and a padding character. The embedding layer 1202 receives the twenty-nine dimensional probability vector and embeds the vector into a twenty-dimensional space. As is known in the art of neural networks, embedding is a method used to represent discrete variables, such as characters, as vectors of continuous numbers. In this example, the character sequence of input data is converted into an embedding in a twenty-dimensional space.

The embedding is then processed by the first residual layer 1204(1) that processes the received embedding as a twenty-dimensional input using a 128-dimensional hidden space that generates a 128-dimensional feature map as the output from the residual layer. The 128-dimensional feature map was selected as the learning capacity of the network to enable the network to operate in environments with limited computing capacity, such as on a wearable device and/or a portable device of a user. In other implementations, the hidden space may be of a different size, such as 256, etc. Processing of the residual layers 1204(1), 1204(2) is discussed further below with respect to FIG. 12B.

The output, or residual (also known as a feature map), from the first residual layer 1204(1) is processed by the first pooling layer 1206. The first pooling layer 1206, which may be a one-dimensional pooling ("1D pooling"), down samples the residual input received at the pooling layer 1206 by summing features of the residual input to reduce the overall length of the input by a factor of two. In the disclosed implementation, with a 128-dimensional feature map as the input, the output from the pooling 1206 will be a 128-dimensional pooled feature map with the length halved.

The pooled feature map output from the first pooling layer 1206, is provided as an input to the second residual layer 1204(2). The second residual layer 1204(2) processes the received input, which in this example is a 128-dimensional input using a 128-dimensional hidden space and produces a second 128-dimensional feature map. As noted above, processing of the residual layers is discussed further below with respect to FIG. 12B.

The output of the second residual layer 1204(2), in this example, the second 128-dimensional feature map, is again down sampled through a second 1D pooling layer 1210. Similar to the first pooling layer 1206, the second pooling layer, in this example, down samples the residual input received by the pooling layer 1210 by summing features of the residual input to again reduce the length of the input by a factor of two. In the disclosed implementation, with a 128-dimensional feature map as the input, the output from the second pooling 1210 will be a 128-dimensional pooled feature map. Through both one-dimensional poolings, the overall length of the input to the network 1200 is reduced by a factor of four.

The pooled feature map output from the second pooling layer 1210 is processed by a normalization layer 1212. The normalization layer 1212 removes any outlier data in the pooled feature map. In some implementations, the normalization layer may determine the average mean and remove any data of the pooling layer that is beyond one standard deviation from the average mean. In other implementations, the normalization layer may remove data of the pooling layer that is beyond two standard deviations from the average mean. The output from the normalization layer is a normalized pooled feature map.

The normalized pooled feature map output from the normalization layer 1212 is provided as an input to the long short-term memory ("LSTM") layer 1214. The LSTM layer 1214 is a sequential model that goes over the sequence of the received input and outputs a representation of the sequence. In this example, the LSTM includes two layers that process the output of the normalization layer 1212. Upon completion of processing, the LSTM outputs a representation of the sequence as a fixed size 128-dimensional output.

The output of the LSTM layer 1214 is provided as input to a residually connected feed forward network ("ResFFN") 1216. The ResFFN 1216 receives as an input from the LSTM layer a 128-dimensional sequence, has a hidden layer size of 64, and an output size of 1. The ResFFN 1216 processes the fixed size sequence from the LSTM layers and produces a single output for each sequence. As discussed above, the sentiment data may be any value in a range of values corresponding to different sentiments and is representative of the emotional state of the user that generated the speech that was converted into character data and processed with the disclosed implementations. For example, the range may be any value between negative-five and positive five, with negative values representing more negative sentiment and positive values representing more positive sentiment. In other implementations, the range may be narrower or wider, all negative, all positive, etc. For example, in other examples, the range may include values between zero and five, with zero representing negative sentiment and five representing positive sentiment.

Figure 12B:
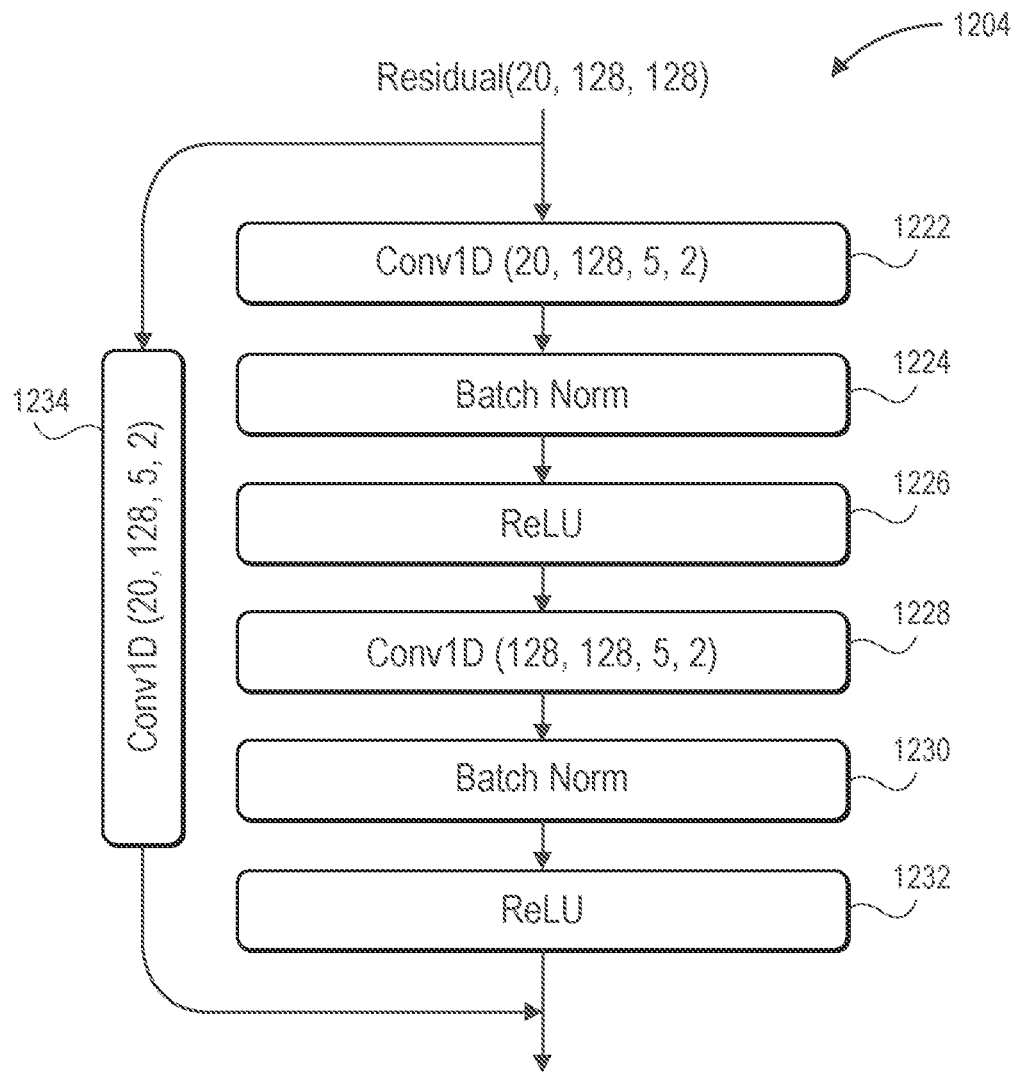
FIG. 12B illustrates a block diagram of residual layers of the character-level emotion detection network of FIG. 12A, in accordance with described implementations.

FIG. 12B illustrates a block diagram of the residual layers 1204(1), 1204(2) of FIG. 12A, in accordance with described implementations. As is known, the residual layers typically include one or more convolutions, such as convolutions 1222, 1228, each of which are followed by normalization layers 1224 and 1230 and activation layers, generally referred to as Rectified Linear Units ("ReLU") layers 1226, 1232. In the illustrated example, the convolution layers 1222, 1228 each apply filters having a kernel size of five and a padding of two. In other implementations, the convolution layers may utilize different kernel sizes and/or paddings and those illustrated here are provided only as examples.

Finally, as is known, the residual layer 1204 may also include a skip connection 1234 that is a convolution included in the residual 1204 to ensure that the processing does not get stuck in the nonlinearity of the ReLU layers.

Figure 13A:
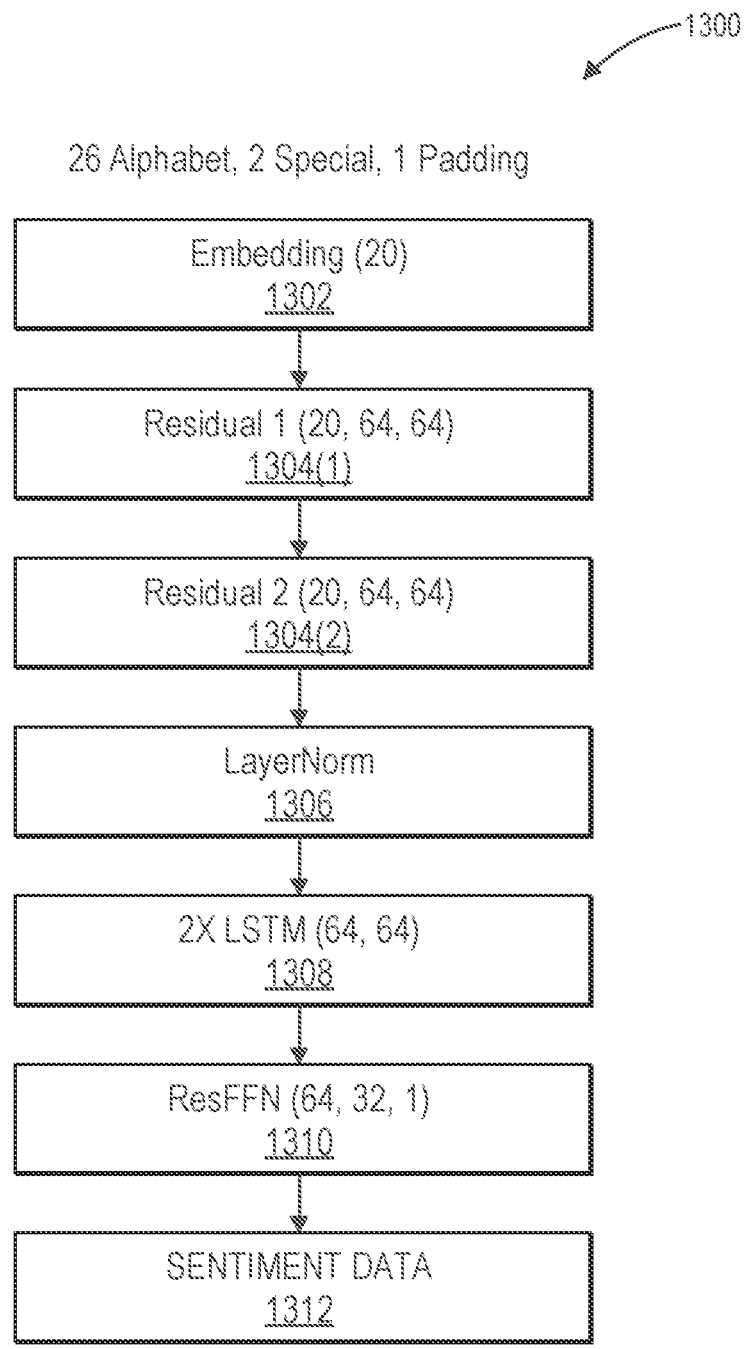
FIG. 13A illustrates a block diagram of another character-level emotion detection network used to convert an input into sentiment data, in accordance with described implementations.

FIG. 13A illustrates a block diagram of another CED network 1300 used to convert an input of character data into sentiment data, in accordance with described implementations. In comparison to the CED 1200 illustrated in FIG. 12A, the CED 1300 includes pooling layers within the residual layers, as discussed further below with respect to FIGS. 13B and 13C. The CED 1300 is also more compact with only 64 dimensions.

As illustrated in FIG. 13A, the CED network 1300 includes an embedding layer 1302 followed by two residual blocks 1304(1), 1304(2), a normalization layer 1306, two layers of Long Short-Term Memory ("LSTM") 1308, and an ResFFN 1310. In the example illustrated in FIGS. 13A through 13C, the input sequence length is reduced by a factor of eight, due to the pooling layers included in the residual layers, as discussed further below, before the resulting sequence is fed to the LSTM layer 1308. The normalization layer 1306, which is optional in various implementations, improves the speed of the CED network 1300.

As illustrated in FIG. 13A, in some implementations, the CED network 1300 may be trained to receive an input sequence of character data that includes a twenty-nine dimensional input—twenty-six alphabet characters, two special characters, and a padding character. The embedding layer 1302 receives the twenty-nine dimensional input and embeds the input into a twenty-dimensional space.

The embedding is then processed by the first residual layer 1304(1) that processes the received embedding as a twenty-dimensional input using a 64-dimensional hidden space that generates a 64-dimensional feature map as the output from the residual layer. Processing of the residual layer 1304(1) is discussed further below with respect to FIG. 13B.

The output, or residual (also known as a feature map), from the first residual layer 1304(1) is provided as an input to the second residual layer 1304(2), which again processes the input and generates a 64-dimensional feature map as the output from the second residual layer 1304(2). As discussed further below with respect to FIGS. 13B and 13C, the first residual layer 1304(1) includes two pooling layers that shorten the length of the data in total by a factor of four and the second residual layer 1304(2) includes a third pooling layer that again shortens the length of the data such that the length of the output from the second residual layer 1304(2) has been shorted by a factor of eight compared to the original input to the CED.

The output of the second residual layer 1304(2), in this example, the second 64-dimensional feature map, is processed by a normalization layer 1306. The normalization layer 1306 removes any outlier data in the feature map. In some implementations, the normalization layer may determine the average mean and remove any data of the feature map that is beyond one standard deviation from the average mean. In other implementations, the normalization layer may remove data of the feature map that is beyond two standard deviations from the average mean. The output from the normalization layer is a normalized pooled feature map.

The normalized pooled feature map output from the normalization layer 1306 is provided as an input to the long short-term memory ("LSTM") layer 1308. The LSTM layer 1308 is a sequential model that goes over the sequence of the received input and outputs a representation of the sequence. In this example, the LSTM includes two layers that process the output of the normalization layer 1306. Upon completion of processing, the LSTM outputs a representation of the sequence as a fixed size 64-dimensional output.

The output of the LSTM layer 1308 is provided as input to a ResFFN 1310. The ResFFN 1310 receives as an input from the LSTM layer a 64-dimensional sequence, has a hidden layer size of 32, and an output size of 1. The ResFFN 1310 processes the fixed size sequence from the LSTM layers and produces a single output for each sequence. As discussed above, the sentiment data may be any value in a range of values corresponding to different sentiments and is representative of the emotional state of the user that generated the speech that was converted into character data and processed with the disclosed implementations.

Figure 13B:
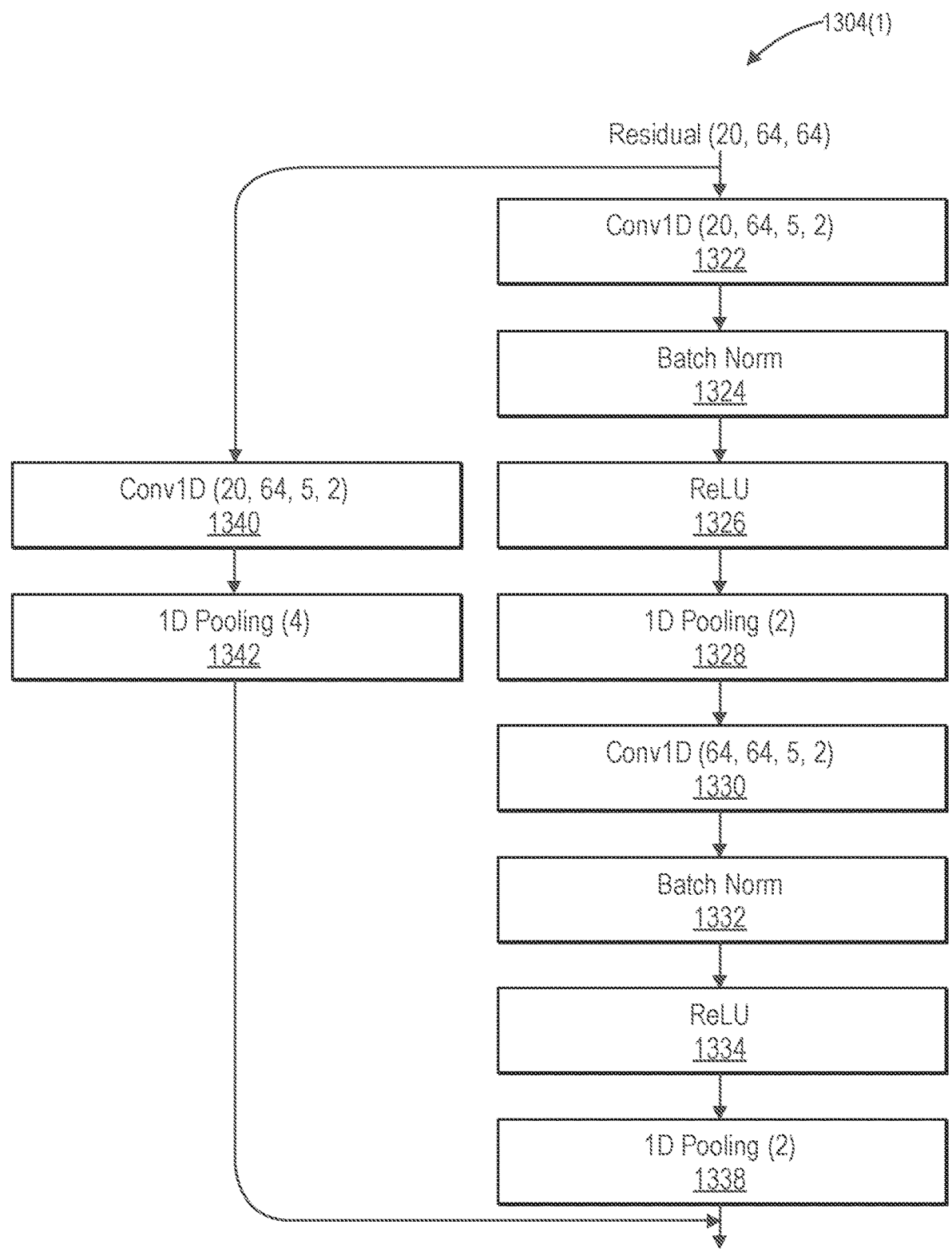
FIGS. 13B and 13C illustrate block diagrams of residual layers of the character-level emotion detection network of FIG. 13A, in accordance with described implementations.
Figure 13C:
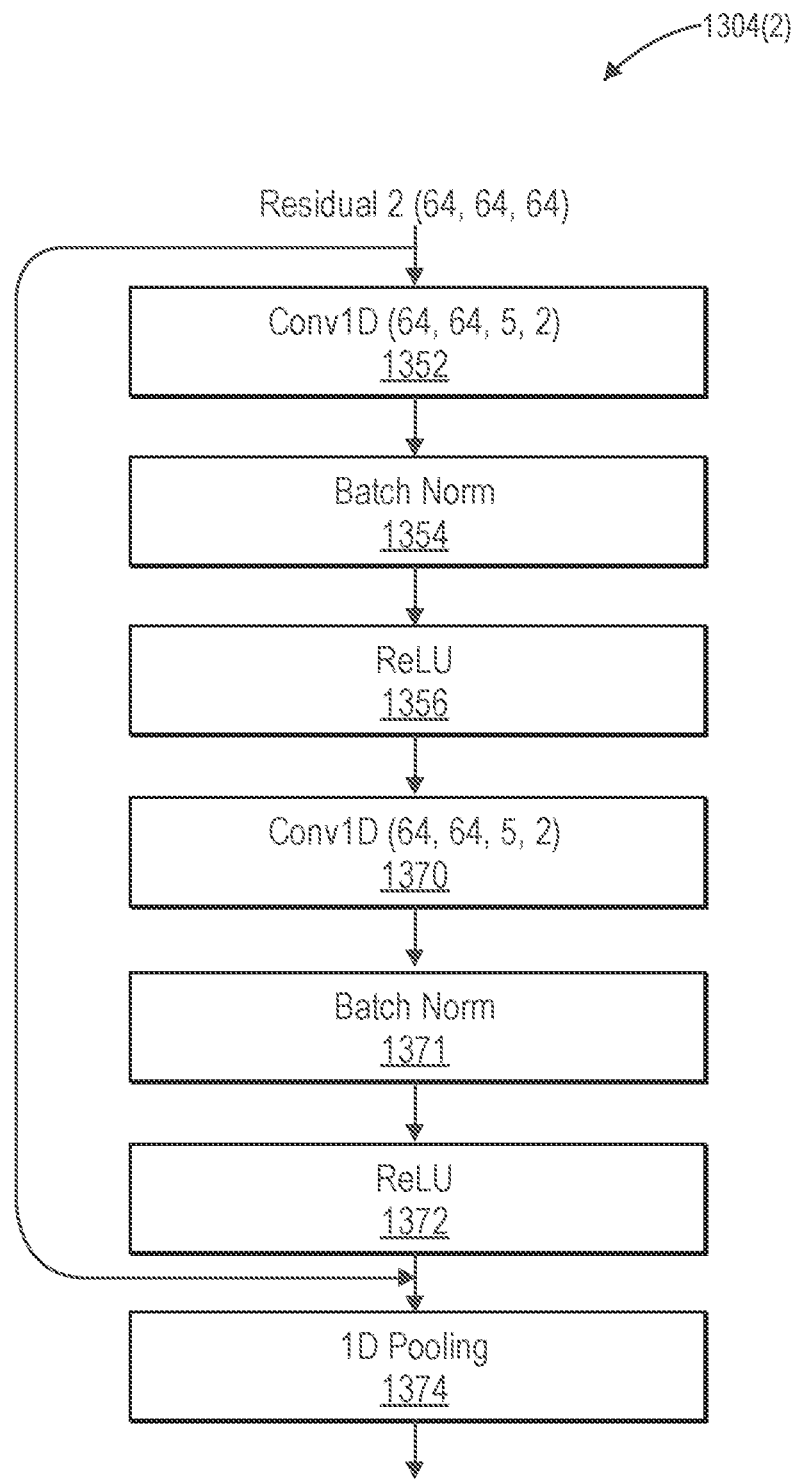

FIGS. 13B and 13C illustrate block diagrams of the first residual 1304(1) and the second residual layer 1304(2) of the character-level emotion detection network 1300 of FIG. 13A, respectively, in accordance with described implementations.

Referring first to FIG. 13B, the first residual layer 1304(1) includes one or more convolutions, such as convolutions 1322, 1330, each of which are followed by normalization layers 1324 and 1332 and ReLU layers 1326, 1334. In this example, the residual 1304(1) also includes a first 1D pooling layer 1328 that receives as input the output of the first ReLU 1326. Similar to the 1D pooling discussed above, the pooling layer 1328 down samples the input received at the pooling layer 1328 by summing features of the input to reduce the overall length of the input by a factor of two. In the disclosed implementation, with a 64-dimensional feature map as the input, the output from pooling 1328 will be a 64-dimensional pooled feature map with the length halved compared to the input. Likewise, the second pooling layer 1338 receives as input, the output from the second ReLU 1334 and processes that input to again reduce the overall length of the input by a factor of two. With both pooling layers in the residual 1304(1), the output of the first residual layer has been reduced in length by a factor of four.

Finally, as is known, the residual layer 1304(1) may also include a skip connection 1340/1342 that is a convolution and pooling included in the residual 1304(1) to ensure that the processing does not get stuck in the nonlinearity of the ReLU layers.

Referring now to FIG. 13C, illustrated is a block diagram 1304(2) of the second residual layer 1304(2) of FIG. 13A, in accordance with disclosed implementations.

Similar to the above, in this example, the second residual 1304(2) includes two convolutions 1352, 1370, each of which are followed by normalization layers 1354 and 1371 and ReLU layers 1356, 1372. In the illustrated example, the convolution layers 1322, 1330, 1352, 1370 of FIGS. 13B and 13C, like the other convolution layers discussed herein, each apply filters having a kernel size of five and a padding of two. In other implementations, the convolution layers may utilize different kernel sizes and/or paddings and those illustrated here are provided only as examples.

Finally, in this example, the output of the second ReLU 1372 is provided to pooling layer 1374 that processes the data and shortens the length of the input to the pooling layer 1374 by a factor of two. As a result, the input to the CED 1300 (FIG. 13A) is shortened in length by a factor of eight.

As will be appreciated, the above examples of CED configurations illustrated in FIGS. 12A, 12B, 13A, 13B, and 13C are provided as examples. In other implementations, the CED configurations may be different with a different number of pooling layers and/or a different configuration.

As is known, character-based natural language processing ("NPL") models have recently become popular, especially in the analysis of documents with frequent misspellings. These models are vocabulary-free and able to cope with frequent misspellings in domains such as social media and electronic health records. Character-based NPL models also do not require a large word embedding matrix, resulting in smaller overall model size. Statistically, character-based NPL can generalize better on small datasets because they do not need to disambiguate a large set of words.

In the disclosed implementations, the CED network 1200/1300 can efficiently process the decoded sequence of characters and extract the emotion content, and a training algorithm based on transfer learning and data augmentation to efficiently train the CED network 1200/1300. As discussed above, the CED network 1200/1300 is configured to shorten the input sequence using several pooling operations. Shortening the input sequence reduces the computational cost of the CED network 1200/1300.

To train the CED network 1200/1300, sentiment detection using a labeled data set of characters may be utilized. The CED network 1200/1300 may then be fine-tuned on a transcribed emotion-annotated audio samples. In addition, in some implementations, training and resulting robustness of the CED network 1200/1300 may be further improved by augmenting character data provided to the CED by randomly changing some of the characters in the input character data.

Figure 14:
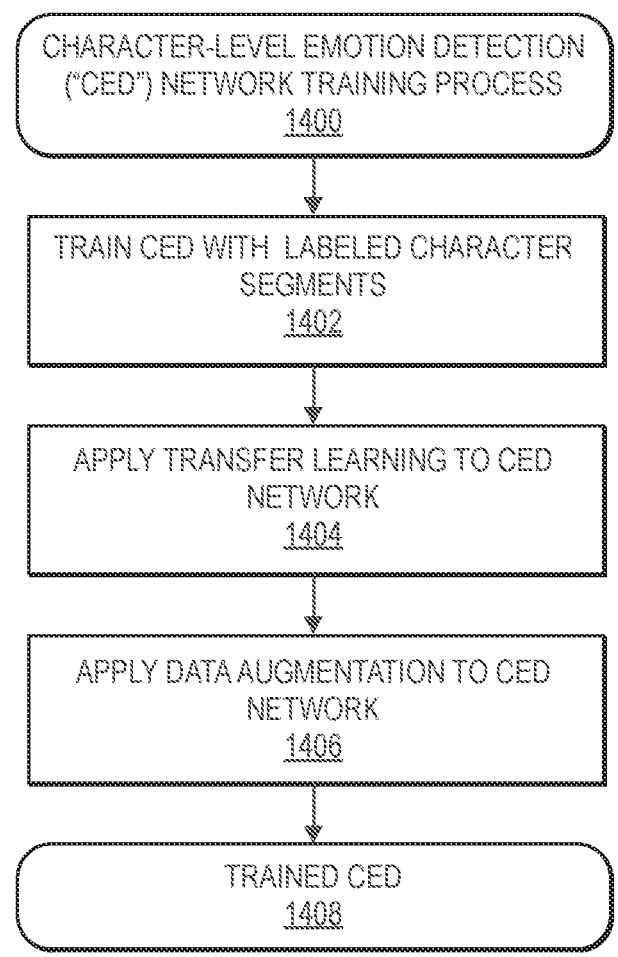
FIG. 14 is an example flow diagram of a character-level emotion detection network training process, in accordance with described implementations.

FIG. 14 is an example flow diagram of a CED network training process 1400, in accordance with described implementations. To begin training of a CED network, such as the CED network 1200/1300 illustrated in FIG. 12A, 13A, the CED network is first trained with labeled character segments, as in 1402. For example, one or more public data sets of character-based content that includes some form of labels relating to a potential emotional or sentiment of the content may be used. Example public data sets may include, but are not limited to, data sets of public reviews of products that also include some form of rating (e.g., star rating), the Interactive Emotional Dyadic Motion Capture ("IEMO-CAP") data set, etc. Training with these data sets is used to predict sentiment scores based on the input character sequences and corresponding labels relating to the character sequences.

In addition to training the CED network with one or more data sets of labeled character segments, in some implementations, transfer learning may also be applied to further refine and train the CED network, as in 1404. For example, transfer learning may be used to correlate the similarities between the sentiment scores and emotion detection tasks In addition to transfer learning, in some implementations, data augmentation may be introduced to randomly replace characters of the character sequences input into the CED network to further increase the robustness of the CED network, as in 1406. An example of data augmentation is discussed in further detail below with respect to FIG. 15.

With the above process 1400, the CED network is trained, as in 1408. Training may be done prior to deployment of the CED network as well as periodically or on-going during use of the neural network.

Figure 15:
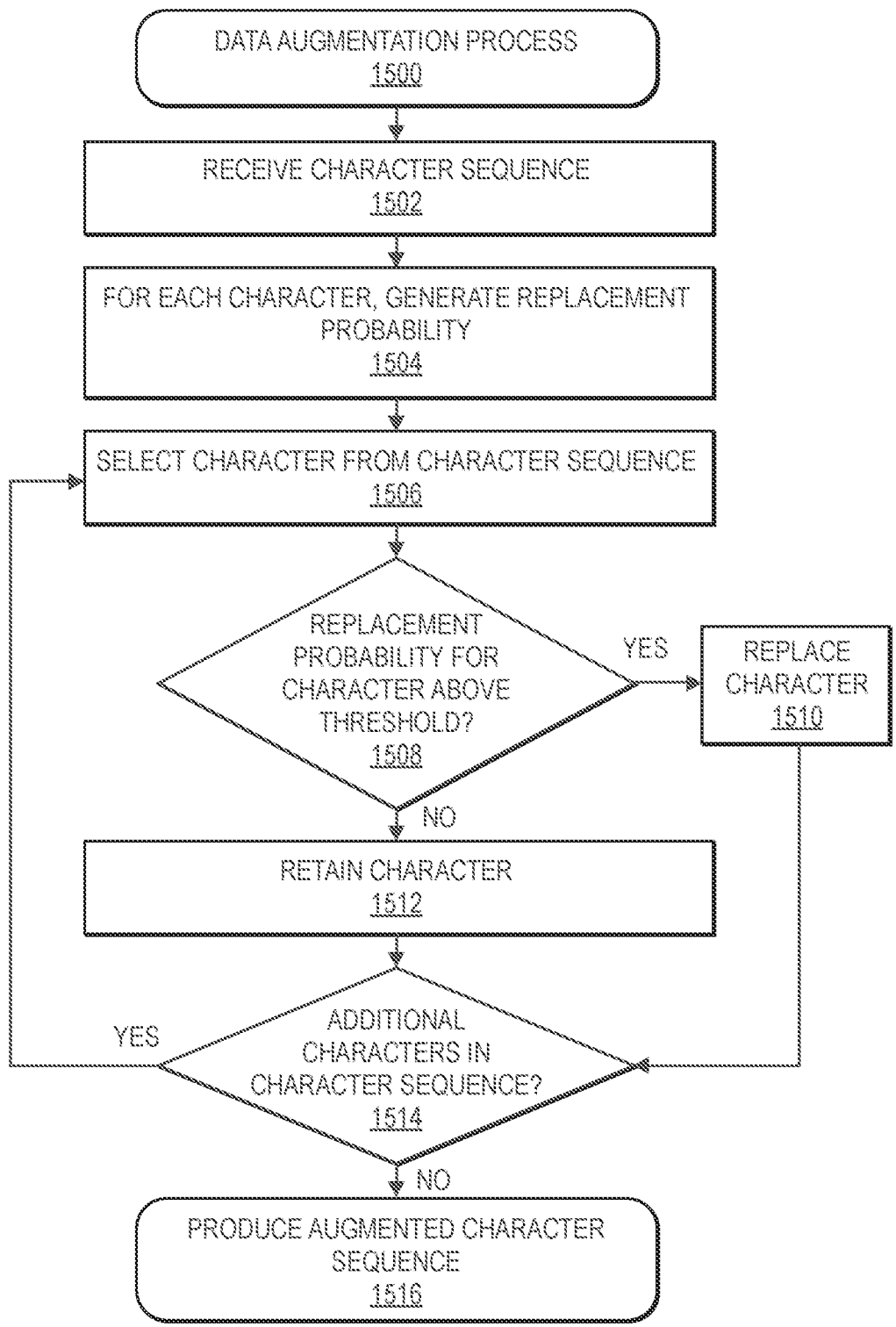
FIG. 15 is an example flow diagram of a data augmentation process, in accordance with described implementations.

FIG. 15 is an example flow diagram of a data augmentation process 1500, in accordance with described implementations. In the example illustrated in FIG. 15, the process 1500 begins upon receipt of a character sequence, also referred to herein as character data, as in 1502. For each character in the character sequence a replacement probability is randomly generated and assigned to the character of the character sequence, as in 1504. The replacement probability may be a score or other value indicative of a probability that the character will be replaced.

Upon determining a replacement probability for each character, a character of the character sequence is selected, as in 1506. For the selected character, a determination is made as to whether the replacement probability for the character is above a threshold, as in 1508. The threshold may be any value or amount.

If it is determined that the replacement probability for the character is above a threshold, the character is replaced with another character, as in 1510. The replacement character may be randomly selected from any of the 26 alphabetic characters or the two special characters. If it is determined that the replacement probability is not above the threshold, the character is retained, as in 1512.

After either replacing or retaining the character, a determination is made as to whether additional characters in the character sequence remain that are to be processed by the example process 1500, as in 1514. In some implementations, all characters of a character sequence may be processed by the example process 1500. In other implementations, only a percentage of the characters of a character sequence may be processed by the example process 1500. For example, in some implementation, only fifty percent of the characters may be processed.

If it is determined that additional characters are to be processed, the example process 1500 returns to block 1506 and continues. If it is determined that no additional characters are to be processed, an augmented character sequence is produced that includes the retained characters and the replaced characters, as in 1516.

Figure 16:
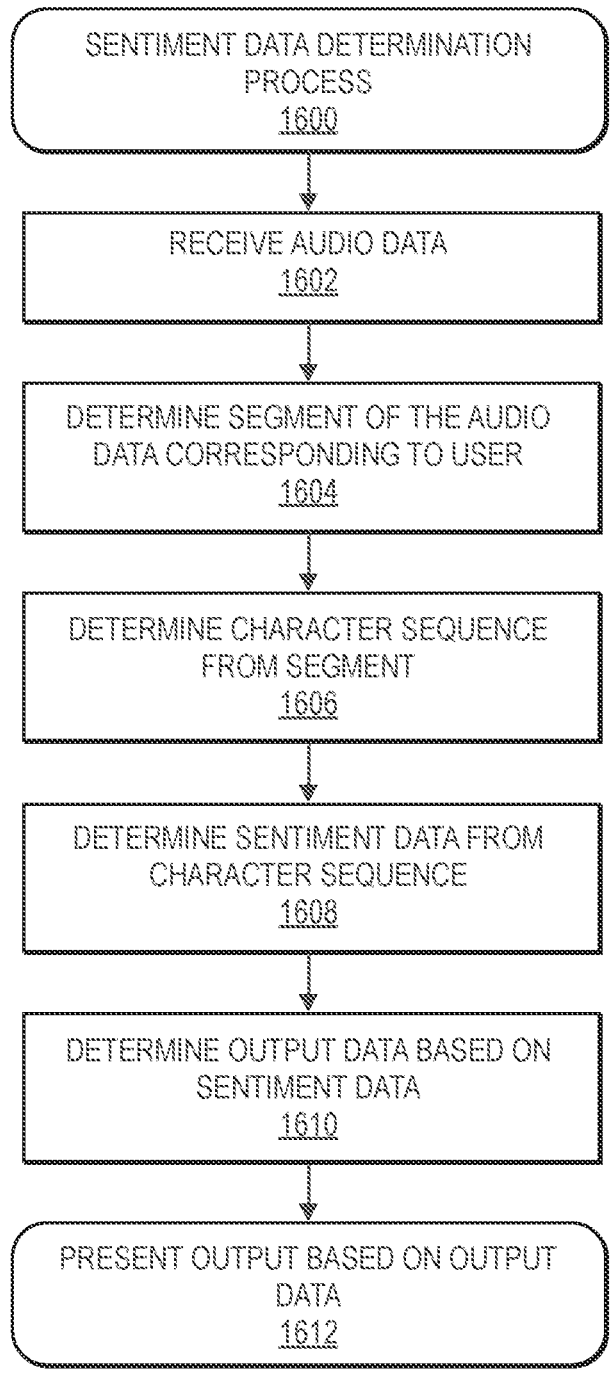
FIG. 16 is an example flow diagram of a sentiment data determination process, in accordance with described implementations.

FIG. 16 is an example flow diagram of a sentiment data determination process 1600, in accordance with described implementations.

The example process 1600 begins upon receipt of audio data, also referred to herein as speech data, as in 1602. For example, as discussed above, a wearable and/or client device of a user may include one or more microphones that receive raw audio within the environment and the received audio generated as audio data. A determination may then be made to determine a segment of the audio data that corresponds to the user, as in 1604. For example, and as discussed above, the audio data may be initially processed to remove non-speech audio data (e.g., wind, noises, etc.) and/or to remove speech generated by other individuals that are not the user.

The segment of audio data is then processed to generate a character sequence of characters, also referred to herein as character data, determined from the segment of audio data, as in 1606. For example, a greed algorithm may be used to processed the audio data to generate a character sequence without having to use an ASR algorithm to determine the words included in the audio data, thereby reducing the computational cost of processing the audio data.

The CED network discussed above may then process the character sequence to determine sentiment data, as in 1608. As discussed, the determined sentiment data is representative of the emotional state of the user when generating the speech that is recorded in the audio data.

Based on the sentiment data, output data may be determined, as in 1610. The output data may be any form of output (e.g., audible, visual, haptic, etc.) that may be sent or presented on any one or more devices (e.g., wearable, client device, portable device, smartphone, etc.). For example, the output data may be a user interface that indicates the determined emotional state of the user while generating the speech, a recommendation to the user as to how to alter the emotional state of the user, etc.

Finally, in some implementations, an output produced from the output data may be presented, as in 1612.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, energy management, and speech processing should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A system, comprising:
a portable device of a user, including:
  a display;
  a first one or more processors; and
  a first memory storing first program instructions that when executed by the first one or more processors cause the first one or more processors to at least:
    detect a call connection between the portable device and a remote device;
    in response to the call connection, send a first notification to a wearable device of the user, via a wireless connection between the portable device and the wearable device, indicating the call connection;
    detect a call disconnection between the portable device and the remote device;
    in response to the call disconnection, send a second notification to the wearable device, via the wireless connection, indicating the call disconnection;
    receive, from the wearable device, via the wireless connection, an audio data that includes a speech of the user output by the user during the call;
    process the audio data to determine, based at least in part on the speech of the user, a sentiment of the user; and
    present the sentiment on the display of the portable device;
the wearable device, including:
  a microphone;
  a second one or more processors; and
  a second memory storing second program instructions that when executed by the second one or more processors cause the second one or more processors to at least:
    receive the first notification indicating the call connection;
    in response to the first notification:
      alter an audio sampling pattern of the wearable device from a first audio sampling pattern having a first sampling frequency to a second audio sampling pattern having a second sampling frequency that is more frequent than the first sampling frequency;
receive audio from the microphone; and
generate, from the audio, the audio data; and
in response to the second notification indicating the call disconnection, transmit at least a portion of the audio data, via the wireless connection, from the wearable device to the portable device.

2. The system of claim 1, wherein the second program instructions, when executed by the second one or more processors further include instructions that cause the second one or more processors to at least:
produce from the audio, a plurality of audio data segments between the first notification and the second notification, wherein each of the plurality of audio data segments includes the speech of the user and the audio data is included in the plurality of audio data segments; and
in response to the second notification, associate each of the plurality of audio data segments as a call interaction.

3. The system of claim 1, wherein the second program instructions, when executed by the second one or more processors further include instructions that cause the second one or more processors to at least:
process a first audio received from the microphone to determine that the speech of the user is included in the first audio;
in response to determination that the speech of the user is included in the first audio, continue to generate the audio data from the audio;
process a second audio received from the microphone to determine that speech of the user is included in the second audio;
process a third audio received from the microphone to determine that the speech of the user is not included in the third audio;
in response to determination that the speech of the user is not included in the third audio:
terminate generation of the audio data; and
generate the audio data such that the audio data includes at least the first audio and the second audio.

4. The system of claim 1, wherein the second program instructions, when executed by the second one or more processors further include instructions that cause the second one or more processors to at least:
collect, from one of more sensors of the wearable device, sensor data corresponding to the user; and
in response to the second notification:
cause at least a portion of the audio data to be associated with a call interaction; and
cause at least a portion of the sensor data collected between the first notification and the second notification to be associated with the call interaction.

5. A computer implemented method, comprising:
detecting a call connection of a call between a first device of a user and a second device;
in response to detecting the call connection;
periodically sampling, with a third device of the user, audio received from a microphone of the third device, to determine if a speech of the user is included in the audio; and
in response to determining that the speech of the user is included in the audio, generating, from the audio, audio data that includes the speech of the user;
detecting a call disconnection of the call between the first device and the second device;
in response to detecting the call disconnection, causing the third device to terminate generating the audio data;
processing the audio data to determine a sentiment of the user during the call; and
presenting the sentiment of the user.

6. The computer implemented method of claim 5, wherein generating the audio data further includes:
generating a plurality of audio data segments, each audio data segment including the speech of the user;
processing, during the call, one or more of the plurality of audio data segments to determine, in real-time or near real-time, the sentiment of the user; and
presenting, during the call, the sentiment of the user.

7. The computer implemented method of claim 5, further comprising:
sending from the third device and to the first device, the audio data; and
wherein:
processing the audio data is performed at the first device; and
presenting the sentiment of the user includes presenting on a display of the first device the sentiment of the user.

8. The computer implemented method of claim 5, further comprising:
collecting, during the call, sensor data from one or more sensors of the third device; and
associating the sensor data with at least one of the call, the audio data, or the sentiment of the user.

9. The computer implemented method of claim 5, wherein the third device is a wearable device of the user.

10. The computer implemented method of claim 5, further comprising:
processing the audio data to include audio data that includes the speech of the user and excludes a second speech that is not the speech of the user.

11. The computer implemented method of claim 5, further comprising:
generating, between the call connection and the call disconnection, a plurality of audio data segments, each audio data segment including the speech of the user output by the user during the call; and
in response to the call disconnection, associating each of the plurality of audio data segments with a call interaction.

12. The computer implemented method of claim 11, wherein each of the plurality of audio data segments corresponds with a different time during the call when the user is speaking.

13. The computer implemented method of claim 5, wherein processing the audio data is performed at least in part at the third device.

14. The computer implemented method of claim 13, further comprising:
sending, from the third device to the first device, an indication of the sentiment of the user, without sending the audio data.

15. The computer implemented method of claim 5, further comprising:
determining a plurality of sentiments of the user during the call, wherein the sentiment of the user includes each of the plurality of sentiments of the user.

16. The computer implemented method of claim 5, further comprising:
presenting a plurality of sentiments determined based on audio data generated during the call.

17. A method to determine sentiment of a user during a call, comprising:
- detecting a call connection of the call with a first device of the user;
- in response to the call connection, periodically sampling, with a second device of the user and during the call, audio to determine if a speech of the user is included in the audio;
- in response to determining that the speech of the user is included in the audio, generating, from the audio, audio data that includes a speech of the user output by the user during the call;
- detecting a call disconnection of the call;
- in response to the call disconnection, terminating the generating of the audio data;
- processing the audio data to determine the sentiment of the user during the call; and
- presenting the sentiment of the user.

18. The method of claim 17, further comprising:
- in response to the call connection, altering an audio sampling pattern of the second device from a first audio sampling pattern having a first sampling frequency to a second audio sampling pattern having a second sampling frequency that is more frequent than the first sampling frequency.

19. The method of claim 17, further comprising:
- sampling, with the second device and at a first time during the call, audio received from a microphone of the second device to determine if the speech of the user is included in the audio;
- in response to determining that the speech of the user is not included in the audio:
  - discarding the audio; and
  - waiting a defined period of time before sampling the audio a second time during the call.

20. The method of claim 17, further comprising:
- collecting, during the call, sensor data corresponding to the user from one or more sensors; and
- associating the sensor data with at least one of the user, the sentiment, or the audio data.

* * * * *